United States Patent [19]

Goldsberry

[11] Patent Number: 6,041,017
[45] Date of Patent: Mar. 21, 2000

[54] METHOD FOR PRODUCING IMAGES OF RESERVOIR BOUNDARIES

[75] Inventor: Fred L. Goldsberry, 3222 Candleknoll, Spring, Tex. 77388

[73] Assignee: Fred L. Goldsberry, Spring, Tex.

[21] Appl. No.: 08/906,671

[22] Filed: Aug. 5, 1997

Related U.S. Application Data

[60] Provisional application No. 60/023,207, Aug. 5, 1996.

[51] Int. Cl.$^7$ ........................................................ G01V 1/36
[52] U.S. Cl. .................................. 367/38; 367/37; 367/47
[58] Field of Search ................................. 367/57, 68, 69, 367/38, 37, 47

[56] References Cited

U.S. PATENT DOCUMENTS 5,796,678 8/1998 Pisetski ...................................... 367/38

*Primary Examiner*—Cristine K. Oda
*Assistant Examiner*—Anthony Jolly
*Attorney, Agent, or Firm*—Madan, Mossman & Sriram, P.C.

[57] ABSTRACT

A method of producing images of the limits of a geologic reservoir from measurements of fluid pressure in a well controlled to produce from the reservoir at a constant flow rate. The measurements are taken over a period of time, which includes initiation of well flow and recorded in a plot of well pressure v. time. The method includes detecting abrupt changes in slope of the pressure v. time function, where each abrupt change signifies the arrival of a primary shock wave at a discrete section of a boundary limit of the reservoir; and calculating the minimum radial distance to the discrete section from the well bore as a function of wave travel time. The changes in the slope of the pressure v. time function are used to calculate the curvature of the boundary at the minimum radial distance. The angular disposition of each discrete section or reservoir limit is then adjusted about the origin and adjustably re-positioned on its point of contact with its associated distance radial limits to provide with the other discrete sections, a simulation of the reservoir boundary. Observations from multiple wells reduce any ambiguity in the interpretation.

26 Claims, 21 Drawing Sheets

$$\theta = \text{Tan}^{-1} \sqrt{\frac{t-t1}{t1}}$$

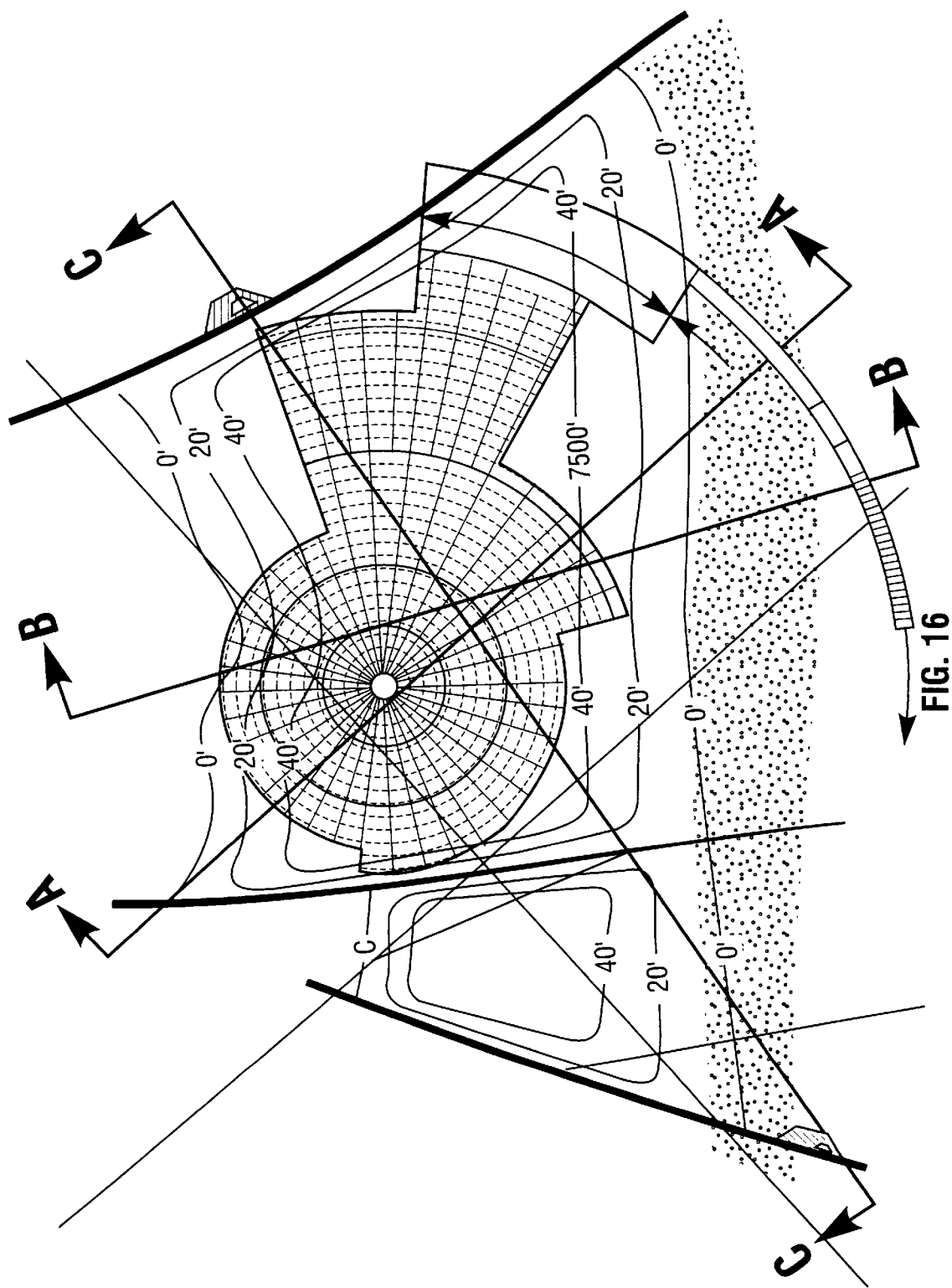

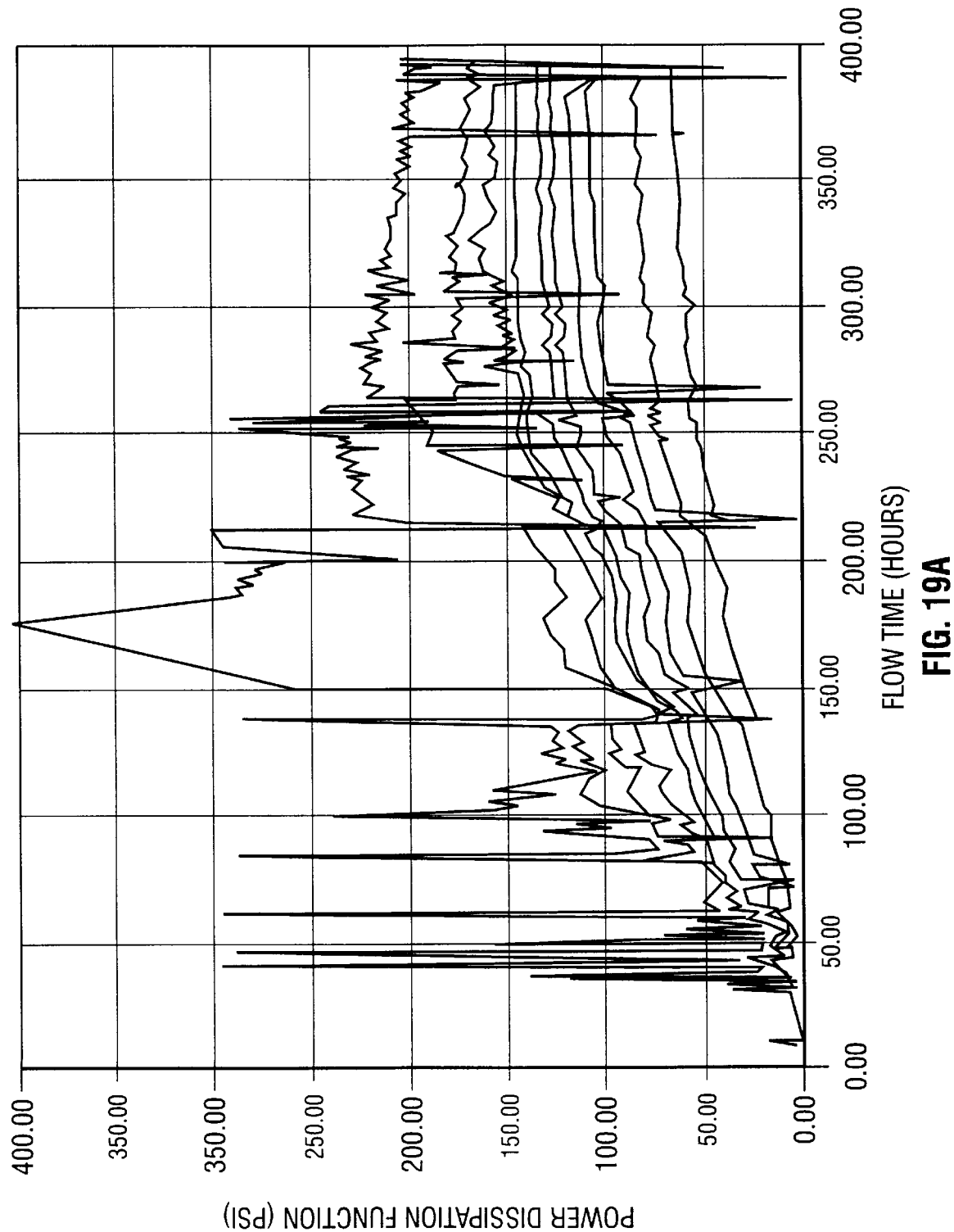

METHOD FOR PRODUCING IMAGES OF RESERVOIR BOUNDARIES

CROSS REFERENCE TO RELATED APPLICATIONS

This application claims a priority date of Aug. 5, 1996, based on Provisional Application Ser. No. 60/023,207, filed on Aug. 5, 1996.

FIELD OF THE INVENTION

The invention relates to a method for identifying and producing dimensionally accurate images of the boundary limits of geologic reservoirs from transient pressure data obtained in a well producing from the geological reservoir, and more particularly where the method is based on concepts of fluid inertia and static capillary pressure which control the distribution of energy in the reservoir.

BACKGROUND OF THE INVENTION

Heretofore, methods for predicting the size and volume of a geologic reservoir and developing and identifying representative images of its boundary limits have relied on seismic and geologic data and classic diffusion theory based upon the hydraulic diffusively of the reservoir's formations. Historically, data plots of reservoir pressure versus a semilogarithm of well flow time have been used to graphically analyze well flow tests and many such analyses have noted that the plots include abrupt changes in slope of the pressure versus time function and suspected that these abrupt changes have relevance to the reservoir boundaries. These measurements of pressure versus flow-time have been based on two types of conditions. In one, known as the "flow test" or "drawdown", the fluid flow into the well is shut off for an extended period of time until the pressure reaches a steady state, following which the well is allowed to flow at a constant flow rate while the pressure is monitored. Another kind of test is the "shut in" or "buildup" test and is the reverse of the flow test: the reservoir is allowed to flow for an extended period of time until the pressure stabilizes and then the flow is shut off while the pressure is monitored. Yet another kind of test is called an "injection test" in which a borehole fluid is injected into the formation, the injection of fluid is stopped, and the pressure monitored.

Variations on the "flow test" and the "shut in" test include observations at a plurality of wells in a reservoir. In such multiple well observations, for example, one well might be opened up in a flow test while the pressure in a second, shut in, well is monitored. A another example of multiple well observations, one well might be shut in while the pressure in a second, flowing well, is monitored. These are called interference tests.

However, analysts note that while a diffusion theory mathematical model incorporating fixed boundaries or limits provides long smooth functional transitions between pressure-time function slope changes whereas slope changes relating to actual changes in nature in permeability boundaries in geologic formations, are often sharp and abrupt when a reservoir limit is encountered.

Furthermore, attempts at the superposition of infinite acting diffusion equation fields in such analyses have resulted in calculations of a distance d between the well in the reservoir and the reservoir boundary limits have been proven to be very imprecise, such calculations being most often based on the theoretical relationship of $d=0.749\sqrt{\eta t}$ where d is the distance from the well to the first limit, $\eta$ is the hydraulic diffusivity of the formation, and t is the time elapsed from the initiation of well flow. This relationship is based upon a single linear sealing boundary in an infinite reservoir. It has been rigorously derived many times as the projected intersection of the 2:1 slope change in the pressure-time function. Other derivations have given values ranging up to 0.5. It carries through to any model based upon constant flow and the diffusivity equation. The present invention provides a more precise and reliable method for determining the distance d from a reservoir well to each of the reservoir boundary limits as a discrete engineering calculation and for deriving a more representative identification and simulation of the reservoir's boundary limits.

SUMMARY OF THE INVENTION

The invention is directed to a method for deriving discrete boundary limits of a geologic reservoir from measurements of transient well pressure obtained in a vertical, near vertical, or horizontal well bore of a well which is completed to produce from the reservoir at a constant flow rate and wherein an initiating capillary rupture shock wave is generated upon the initiation of well flow and expands radially outwardly from the well bore. The method requires continuously sensing fluid pressure in the well over a period of time which includes the time of initiation of well flow and recording the pressure data in a plot of well pressure versus time. The method includes the further steps of determining the minimum radial distance from the well bore to each discrete section of reservoir boundary limit indicated by each abrupt change of slope in the pressure vs. time curve which occurs on impact of the shock wave with each discrete limit, said minimum radial distance being derived according to the formula $d=2\sqrt{\eta t}$ where d is the distance to the discrete boundary limit, $\eta$ is the hydraulic diffusivity of the reservoir formation expressed as area units per unit of time and t represents time elapsed since the initiation of well flow to the arrival of the shock wave at a discrete boundary limit; and developing a polar coordinate system chart where the well represents the origin of the system and each detected discrete boundary limit is located a distance from the origin corresponding to the distance derived therefor. The method further requires for each discrete boundary limit, inscribing on the chart a circle which is centered about the origin and inscribing a minimal radius corresponding to the distance d derived for each such limit in any arbitrary direction of the origin, each intersection of a minimal radius line and its associated circle representing a point of tangency of a tangent line to the circle and to a discrete section of the reservoir boundary limit at said point. For each discrete section of boundary limit indicated by an abrupt change of slope in the pressure versus time function, the method further requires calculating a slope $M_i$ of the pressure-time function immediately following said abrupt change and a slope $M_{i-1}$ of the pressure time function immediately preceding the abrupt change and then, for each discrete section of reservoir limit, calculating the value $\alpha+\beta$ from the relation $$\frac{M_i}{M_{i-1}} = 2\frac{\pi}{\pi + \alpha + \beta}$$

the value of which when greater than 2 indicates concavity of a limit and if less than 2 indicates convexity of the limit and wherein $\alpha+\beta$ represents the sum of angles of deviation from a straight or linear boundary being traversed by a pair of truncating radii to spreading points of contact of the expanding shock wave with said discrete boundary limit, said truncating radii being of equal length to one another and located on opposite sides of the associated minimal radius. Also, for each discrete boundary limit, the angle $\Delta\Theta$ between the two truncating radii associated with said each discrete reserve limit is determined in accordance with the formula $\Delta\theta=2\Theta-(\alpha+\beta)$ where $2\Theta$ is the time equivalent reference displacement for the two truncating radii for each other for a straight line boundary, and $$\theta = \text{Tan} - 1 \sqrt{\frac{t-t_1}{t_1}}$$

where $t_1$ is the travel time of the capillary shock wave to said discrete boundary limit and t is a selected travel time of the shock wave where t is greater than $t_1$, each said discrete boundary limit having a length defined by the distance between the intersections of the pair of truncating radii with the tangent line associated with said discrete boundary limit. The angular disposition of each discrete boundary limit is then adjusted about the origin of the polar coordinate chart and then re-positioned on its tangent circle defined by its associated distance radial to the point of contact in relationship with the other discrete boundary limits to thereby provide a symmetric energy equivalent simulation of the reservoir boundary. The map then generated may be compared to a geologist map for verification or amendment of the geologist's map.

BRIEF DESCRIPTION OF THE DRAWINGS

FIG. 16 is a reproduction of the reservoir diagram of FIG. 10 with a diagram of circular arcs superimposed thereon for detecting points of tangency of the expanding shock wave with the detected discrete boundary limits;

FIG. 19(a) is a Cartesian coordinate graph wherein the abscissa is the time of flow of the capillary energy shock wave and the ordinates are the slope values M of the pressure versus time function wherein $M=2.303 \cdot \partial P/\partial t$ and P equals fluid pressure;

DETAILED DESCRIPTION OF THE INVENTION

Figure 1:
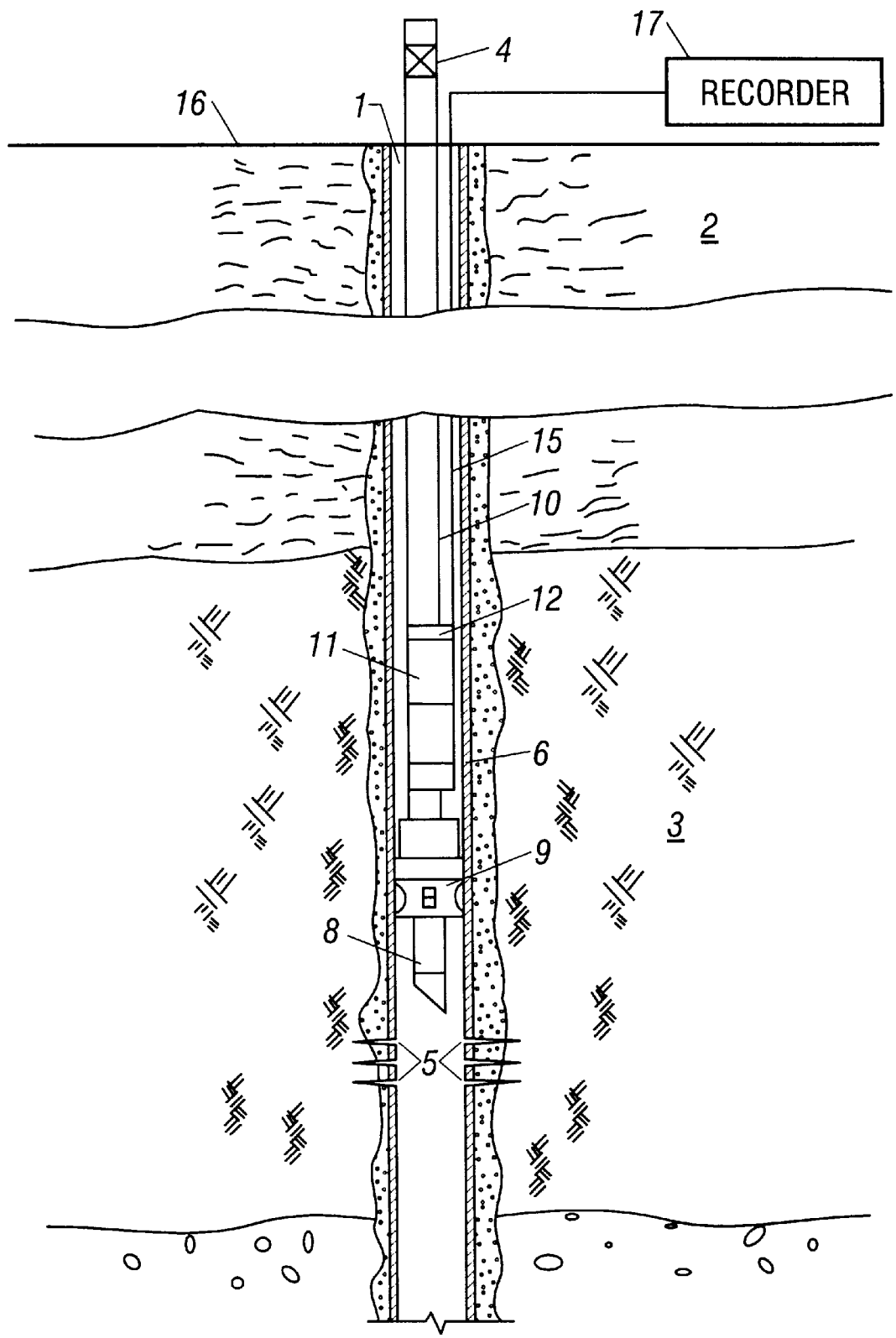
FIG. 1 is a schematic illustration showing a pressure sensing tool installed in a well bore extending into a geologic reservoir whose boundary limits are to be ascertained.

The method of the present invention is utilized for producing images of reservoir boundary limits and is based upon concepts of fluid inertia and static or initiating capillary pressure which control the distribution of energy in the reservoir. The method requires that a well bore 1 be drilled through earth formations 2 into the reservoir 3 as shown in FIG. 1 and geologic fluids be produced from the reservoir into the well at a constant flow rate controlled by a well choke 4. Reservoir fluids are produced through perforations 5 in the well liner 6 and directed through a tail pipe 8 on a production packer 9 to a string of tubing 10 for travel to the earth's surface. Along the length of the string of tubing is a side pocket mandrel 11 which is constructed and arranged to internally receive a retrievable side pocket well tool such as a pressure gauge 12. The pressure gauge 12 installed in the side pocket mandrel 11 may be any one of several commercially available pressure gauges which provide an electrical read-out signal. The pressure readings can be continuous or periodic, such as every 10 seconds although much larger periods might be acceptable if the reservoir is very large. One such gauge includes an inductive coupling member positioned relative to an inductive coupling member in the side pocket mandrel 11 so as to passively transmit pressure data from the pressure gauge to the inductive coupling member in the side pocket mandrel. The inductive coupling member in the side pocket mandrel is electrically connected to a conductor cable 15 in an external conduit which extends to the surface 16 of the earth and a recorder 17 for a surface read out and recording of the downhole data on a real time basis. Fluid pressure of the flowing fluids is sensed in the well continuously over a period of time and in a time frame which includes the time of initiation of flow from the well. The sensed pressure data are recorded with respect to time so that they may be continuously plotted. Preferably, the period of time is extended until the pressure measurements assume a constant linear relationship with respect to time.

While it is generally preferred that a pressure gauge for sensing fluid pressure in the well be placed in the portion of the well bore which is located in the reservoir, other devices and methods which provide a representative bottom hole pressure might be employed, including methods for producing flowing tubing pressure data which may be corrected or uncorrected.

The theory from which the imaging method of the invention has evolved utilizes the concept of a moving capillary pressure shock wave created by the initiation of well flow from the reservoir and the concept that capillary shock waves regulate fluid flow in the geologic reservoir. When a well which extends into a reservoir is opened to produce fluids, the porosity of the geologic formations of the reservoir, the value of which can be readily determined from cores taken from the formation, is a controlling, though not exclusive, factor in the rate of flow of geologic fluids from the reservoir. The reservoir formations are comprised of numerous interconnecting pores and it is a premise of the theory that before a fluid can begin to move from one pore to another, it must initially break a very weak electronic membrane that exists at the pore throat then later adjust that membrane for any subsequent abrupt changes in flow. Then the fluid must flow away from the rupture plane in order for the next pore throat membrane to fail. This flow of fluid is dependent on the ability of the capillary to carry the fluid toward the producing well. This process produces an expanding moving boundary as a wave front between the active fluid filled reservoir encompassed by the wave and the unincorporated remainder of the reservoir. The reservoir pressure responds to this moving boundary in accordance with Newton's Laws for momentum and the laws of thermodynamics. Each time the outer wave front boundary changes because of an impact with a permeability limit, a new compensating inner shock wave boundary is formed. Once formed these circular wave front boundaries move at relativistic speed based upon their time of generation.

The magnitude of the static rupture at each pore throat need not be large for it to have a regulating effect upon the flow of fluid in the reservoir. The process is a series of tiny pulses composed of alternating rupture . . . flow . . . rupture . . . flow . . . rupture . . . and so on until no more rupturable pores can be added to the line. The rupture or adjustment pressure differential, that is initiating capillary pressure, need only be non-zero.

Currently accepted theory presumes that all connected fluid in the reservoir can move infinitesimally upon initiation of flow from any well in the reservoir. The theory on which the present invention is based, which has been designated as "Petroporokinekinetics Theory" or more simply as "Bubble Theory" recognizes each connected fluid-filled pore as an electronically bounded fluid-filled capsule that must be ruptured in order for it to be connected to the active body of fluid that surrounds the well bore. The present theory applies the concept of the bubble and the physical laws pertaining thereto to fluid-filled porous media, such as the geologic reservoir which comprises a collection of many bubbles, water-filled bubbles or droplets, film-wetted surfaces, electronic membranes across porosity channels, wetted particles, and fixed electronic bonding sites on the surface of the formations. The equations of motion relevant to the "Bubble Theory" are based upon a model of a radially growing region of flowing fluid around the well bore during an infinite acting period.

It is to be appreciated that "Bubble Theory" and Classic Diffusion Potential Theory generate consistent results for pure radial flow because diffusion theory tends toward the same asymptotic solution for the initial 360° radial flow period. As a well is flowed, the "Bubble Theory" holds that a bubble rupture front is formed and begins to pass through the reservoir. It is characterized by depletion of pore pressure at a pore throat which results in a differential pressure across the pore throat sufficient to allow it to rupture. Only then is actual fluid movement initiated. As the capillary rupture shock wave passes, the electronic membranes along the radial stream lines do not rupture because no differential pressure exits to rupture them. The membranes do not need to have much strength as they are coincident with the streamlines. The active fluid behind the rupture front responds to a dynamic equation of motion that is dominated by the diffusion terms. The inertial terms are useful for assessing the characteristic velocity of transmission of small changes of pressure behind the wave through the open capillaries behind the wave front. The pressure distribution behind the wave front rapidly redistributes itself to maintain a uniform rate of pressure depletion in accordance with the second law of thermodynamics, that is, the bounded system tends toward a constant rate pressure drop at any given point of time throughout the region bounded by two succeeding shock waves.

The movement of the wave front and velocity of the rupture wave is derived by using a simple perturbation technique initiated by a single defect in undisturbed reservoir space. The defect can be described as a single differential moving element that opens a capillary or bundle of capillaries through the reservoir. This capillary is a string of pore spaces wherein each pore throat normal to fluid flow is opened by sequentially rupturing the successive pore throats that exist along the direction of the pressure gradient. Those pore throat electronic membranes that exist along the sides of the capillary, parallel to the imposed radial stream lines, remain intact.

Figure 2:
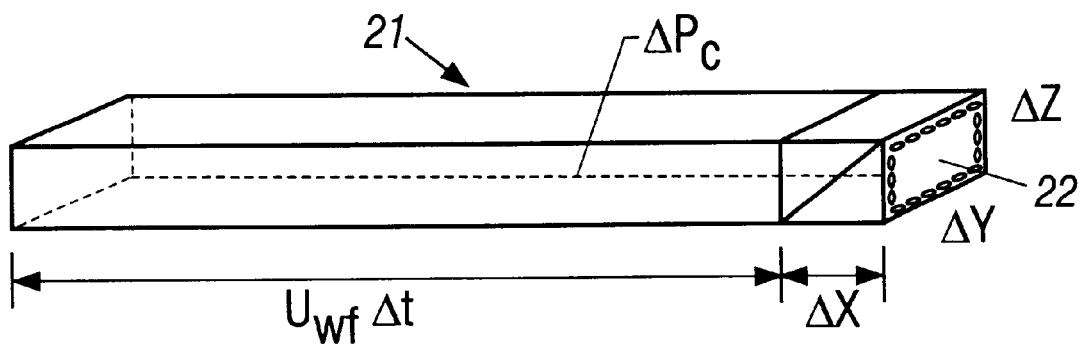
FIG. 2 is a schematic representation of a small differential volume located at the head of a growing bundle of capillaries developing behind a moving capillary shock wave in a geologic reservoir.

What physically happens when the primary capillary wave begins to propagate is herein explained with reference to FIG. 2 which depicts the growth of a cluster of adjacent capillaries. As seen in FIG. 2, the small differential block 21, of dimensions $\Delta X$ by $\Delta Y$ by $\Delta Z$, represents a traveling rupture volume $\Delta V$ at the head of the growing capillary or bundle of capillaries. It functions as a moving steady state shock wave that must pass the rupture volume flow of fluid into the capillary, the head of which is at wavefont 22 of the shock wave. This is the amount of fluid expansion represented by $\Delta P_c$ (static capillary rupture pressure) that must be removed from the cell in order that the next pore cell in the line of movement can rupture. The volume of fluid liberated, $\Delta V$, is quantified by the definition of compressibility in Equation (1) as follows:

$$\frac{\Delta P_c}{\Delta V} = -\frac{1}{C_t V} \tag{1}$$

where $\Delta P_c$ is the pore throat capillary rupture differential pressure or initiating capillary pressure, $\Delta V$ is the leading edge traveling volume element through which the fluid liberated by the rupture must pass, $C_t$ is the total system compressibility, and V is the total volume of the capillary.

It is to be noted that although the theory derived herein is based upon the Cartesian system and the capillary length, the derivation can be made for cylindrical coordinates and spherical coordinates as well, or for that matter, any line "L". It is not necessary that the element move in a straight line, only that it follows some path. The element is sensitive only to the volume of the reservoir that it has incorporated into the capillary and the current rate of incorporation. The capillary bundle element will grow in the direction of the weakest membrane.

The weakest membrane is both a function of its inherent strength to sustain a differential pressure and the differential pressure imposed. Capillaries growing in parallel (or bundles of capillaries in the form of elements) will deplete the pressure equally across membranes that exist between them. This keeps the membranes intact between capillaries along the flow paths or streamlines. Thus, the formation will always have unbroken membranes along the flow paths through the formation. This inscribes flow direction "memory" analogous to how residual magnetic fields produce memory in the memory core of a computer. It may be considered that the element is referenced only to flow throughput and the sum of the flow that has passed through it.

For the element to progress, the total volume that has previously passed through it, V, can be related to the current throughput as $$V = q \cdot t_A \tag{2}$$

where $t_A$ is Time Apparent and Time apparent is the median time projected by the Volume divided by the current flow rate through the element.

The volume of the element is $$V = \Delta X \cdot \Delta Y \cdot \Delta Z \tag{3}$$

If the initiating capillary pressure is considered as $\Delta P_c$, then the compressibility equation may be written:

$$\Delta P_c = -\frac{\Delta X \cdot \Delta Y \cdot \Delta Z}{C \cdot V} = -\frac{\Delta X \cdot \Delta Y \cdot \Delta Z \cdot \phi}{C \cdot q \cdot t_A} \tag{4}$$

where $\Phi$ is formation porosity and C is total system compressibility. In accordance with Darcy's Law $$\frac{q}{\Delta Y \cdot \Delta Z} = -\frac{\kappa}{\mu} \cdot \frac{\Delta P_C}{\Delta X} \tag{5}$$

$$\Delta P_C = \frac{q \cdot \Delta X \cdot \mu}{\Delta Y \cdot \Delta Z \cdot \kappa} = -\frac{\Delta X \cdot \Delta Y \cdot \Delta Z \cdot \phi}{C_t \cdot q \cdot t_A} \tag{6}$$

$$q^2 = \frac{\kappa \cdot \phi \cdot (\Delta Y \cdot \Delta Z)^2}{\mu \cdot C_t \cdot q \cdot t_A} \tag{7}$$

and $$q = \sqrt{\frac{\kappa \phi}{\mu \cdot C_t \cdot t_A}} \cdot (\Delta Y \cdot \Delta Z) = U_{wf} \cdot \phi \tag{8}$$

but from the continuity equation for pore volume incorporation into the reservoir:

$$q = U_{wf} \Phi \cdot \Delta Y \cdot \Delta Z \tag{9}$$

therefore $$U_{wf} = \sqrt{\frac{K}{(\phi \mu C_t t)}}$$

The regulating mechanism for the growth of the active region or cone of influence about the well bore upon initiation of flow is the depletion of pressure in a small elemental space to develop a pressure difference equivalent to initiating capillary pressure or that pressure necessary to rupture the bubble at the pore throat. The depletion of this leading or shock wave element is controlled by its ability to transport fluid through it and into the active portion of the reservoir. This element will proceed in the direction of the weakest port throat or parallel to adjacent pore throats. The element is a creature of mass incorporation. The entire mass of fluid that flows through the leading element must continue to deplete in order for the element to rupture succeeding pore throats and to advance. The element acts as a depletion volume that is added to the system while the integral of fluid that has passed through it is the system volume. Fluid is carried through the element as a steady process based upon Darcy's Law, which law represents the steady resistance to flow through the element. In this case, the element moves through the formation incorporating active volume into the active mass of reservoir fluid.

The moving element incorporates mass as a function of its depletion by the initiating capillary pressure, $\Delta P_c$. This depletion is controlled by a gradient $\Delta P_c/\Delta X$ developed within the element by Darcy's Law. It is therefore possible to write a material balance for mass flow through the element that will describe the volume in terms of the velocity of the element which at this point is unknown.

The mass that passes through the cell in a given unit of time can also be described as $\Phi \cdot \rho \cdot \Delta Y \Delta Z \cdot q$, where $\Delta Z$ is displacement with respect to the Z-axis, $\Phi$ is formation porosity, $\rho$ is the fluid density, and $U_{wf}$ is the velocity of the capillary wavefront. The initiating capillary pressure, $\Delta P_c$, may then be expressed as $$\Delta P_c = -\frac{\Delta V}{C_t \cdot V} \qquad (11)$$

In accordance with Charles' Law, the mass depletes in pressure by the initiating capillary pressure, $\Delta P_c$. The mass allowed to flow through the moving element that is moving through the formation is:

$$U_{bulk} = -\left[\frac{\kappa}{\mu}\right] \cdot \left[\frac{\Delta P_c}{\Delta X}\right] = \frac{q}{\Delta Y \Delta Z} \qquad (12)$$

wherein $\kappa$ is the permeability, $\Delta P_c$ is the initiating capillary pressure, $\mu$ is fluid viscosity, and the term $U_{bulk}$ is an equivalent for mass flow through the element.

The continuity equation defines mass flow as $$dM/dt = \rho \cdot \phi \cdot \Delta V / \Delta t = \rho \cdot U_{wf} \cdot \phi \cdot \Delta Y \cdot \Delta Z = \rho \cdot U_{bulk} \cdot \Delta Y \cdot \Delta Z \qquad (13)$$

where $U_{wf}$ is the velocity of the capillary wave front. Therefore, the following is derived:

$$U_{bulk} = \phi \cdot U_{wf} \qquad (14)$$

It is to be noted that the internal balance is based upon the integral of dM/dt.

The concept of a moving element material balance is symbolized in the schematic of FIG. 2. The individual capillaries that make up the element are going from pore to pore by breaking the weakest port throat that which has developed the greater differential pressure and is closest to rupture. The capillary is indifferent to coordinate system. The element which is moving along a bundle of capillaries responds to the mass that has been incorporated into its segment of the system, that is, the element responds to the incorporated mass between itself and the source of perturbation at the well bore. The depicted capillary length used in the following derivation should be considered to be a line integral. The velocity of the element at any time must be treated as a function of the mass incorporated into the active system and Darcy's Law.

Thus, the velocity of the element may be referenced to time or time referenced to the velocity of the element. Membranes aligned normal to lines of equal potential are infinitely strong. The direction of flow will be along gradient lines. The distance traveled is a line integral. The coordinate system is a function of the field boundary. The element velocity is released to and regulated by Darcy's Law and the compressibility form of the energy equation. The element operates at steady conditions and its velocity is proportional to the mass that has passed through it.

The element is sensitive to the depletion of the mass that it is incorporating such that the shock wave front changes velocity characteristics to match the material that is passing through it at any given instant in time. For example, in the event the wave passes from gas to water saturation, one would expect it to increase in velocity and behave as though the mass already incorporated was a water equivalent. This will cause an apparent distortion in start time of the perturbation and in apparent distance of the wave front from the perturbation. The increase in speed with phase change causes a differential wave velocity that presents some interesting problems at water contacts. If two wave front elements are approaching a water contact or wedge, the first wave element to encounter the water will move ahead at a multiple of the speed of the element that continues to encounter gas. The wave in the water will follow a path of least resistance through the water and at some point will break back into the unincorporated portion of the gas wedge. As a result, a water wedge boundary will be seen as a vertical limit and not a wedge out of gas volume as might be expected. Due to variations in the properties of salt water and gas, it is traditional for a water wedge to appear as a vertical limit due to the under running effect of the shock wave. The appearance of the limit is caused by the mobility contrast between water and gas. On a plot of well pressure versus the semilog of time, a straight tapered water contact will show a semilog slope shift of 1.6 to 1.8 instead of 2 for a vertical fault.

The volume of fluid liberated $\Delta V$, is quantified by the definition of compressibility in Equation (1). This would be the equivalent of Charles Law as applied to fluids of small compressibility and is a fundamental relationship used in fluid mechanics. It is to be recognized in the derivations presented herein that the material balance for flow through the element is referenced to the traveling element. In this case, mass flow equivalent velocity through the element is chosen as the independent variable and the apparent time of travel is the dependent variable. This references the velocity of the block to the flow that is allowed to pass as regulated by Darcy's Law. This will allow separation of variables so that a relationship between velocity and apparent time or mass-based time may be fixed. The resulting relationship may then be tied to an initiating point in time to produce the relationship for velocity as a function of time. The shock wave front will go where it will based upon shape of the formation and fluid factors that govern hydraulic diffusivity. The propagation of the element is then free of coordinate system constrictions as it becomes a line-mass integral. Once the line is pinned to a location, then the location of the wave front element can be made with respect to the point of origin. This concept is used in mechanics to design turbine blades, in which case the equations of motion are conveniently written with the blade as the physical reference and then converted after the blade path solution is accomplished. This concept allows the derivation of the growth of the capillary to be accomplished in a simple manner with reference to the leading edge element rather than referenced to the point of origin. The leading element is at steady state conditions and is indifferent to the point of origin. The initiating capillary pressure and Darcy's Law regulate its movement through reservoir space. By referencing the constant flow through the element, a simple relationship can be written for mass throughput and time as expressed in Eq.(1). This is much like taking a trip while riding backward wherein the scenery is the same but the perspective is different. The element senses how much mass it has incorporated into the capillary, rather than where it is going. In solid mechanics, this concept is called a material coordinate system.

The capillary wave propagation equation derived in the following paragraphs results from the identical cancellation of the cross-sectional area terms in the moving shock element. The resultant equation for velocity and distance traveled by the perturbation are based entirely upon linear distance from the source and related hydraulic diffusivity and time. The terms ΔX and ΔR for the other coordinate systems are interchangeable. Most problems in reservoir engineering are conveniently based upon cylindrical coordinates. This relationship is important to understanding the wave front generation in a horizontal well.

The coordinate system to be selected is determined by the geometry of the perturbation and the boundary conditions. A vertical well is represented by a line source between infinite parallel planes. This is the equivalent of a segment of an infinite line source. This source, when combined with many capillaries of length, $$L = \sqrt{4\eta t},\qquad(15)$$

begets selection of a cylindrical coordinate system whereas a point source would beget a spherical system.

A horizontal well of finite length simulates a race track shape for a disturbance emanating therefrom. As the cylindrical wave system from the well strikes a limit, the system becomes asymmetric—resulting in a new internal system being formed that is symmetric. However, an infinite plane source represents a linear system comprised of all parallel capillaries.

The volume of the capillary can be written for short times as a linear relationship associated with the velocity of the wave front, which velocity is presumed to be acting through a time Δt to provide a linear capillary growth from the initiation of the perturbation. This is shown in Equation (16) as follows:

$$V = U_{wf} \Delta t \Delta Y \Delta Z \qquad(16)$$

Equations (12), (14) and (15) can be algebraically combined to eliminate ΔPc and obtain equation (17) as follows:

$$\phi U_{wf} = \kappa/\mu \cdot C_t \cdot \Delta t \cdot U_{wf} \text{ OR } (U_{wf})^2 = \kappa/\phi \cdot \mu \cdot C_t \cdot \Delta t \qquad(17)$$

Since the term $\kappa/\Phi \cdot \mu \cdot C_t$ represents a group of reservoir and fluid parameters known as hydraulic diffusivity η, usually expressed in square feet per hour, an equation can be obtained to provide a relationship for wave velocity and hydraulic diffusivity as follows:

$$U_{wf} = \sqrt{\eta/t} \qquad(18)$$

wherein the form $U_{wf}$ is a mass related velocity corrected for formation porosity effect.

At time zero, it will therefore be noted from equation (18) that the velocity is infinite, although in practical terms flow velocity is limited by turbulent flow. It is also known that every formation core exhibits a choke flow rate and conversely a choke or maximum fluid flow velocity that cannot be exceeded. This is the velocity associated with what is commonly known as turbulent flow which occurs near the well bore. It is the cause of the so-called "well bore storage effect". During this period long duration pressure oscillations are often observed as a result of trapped pressure that cannot be redistributed in the capillaries faster than the maximum value for $U_{wf} = U_{max}$.

For longer time periods the system will behave as a diffusion system once the theoretical diffusion velocity falls below $U_{max}$ and when the active volume of the reservoir reaches equilibrium with the predicted diffusion volume. For the vast majority of well situations the wave propagation will be diffusion related. $U_{max}$ is of material interest in practicing the method of the invention to be hereinafter described to assure the semilog slope $M_1$ that is picked by the analyst in practicing the method is indeed the correct slope segment.

In Equation (18), the time from inception of a perturbation is noted as t. The integration of this relationship for distance traveled from the perturbation created by the initiating of well flow must be considered as an upper limit. For longer times, after the so-called "well bore storage effect", the observed distance-time relationship is:

$$d = 2\sqrt{\eta t} \qquad(19)$$

For practical purposes, after the impact of near well choke velocity has been overcome, Equation (19), although never reconciled to classic diffusion theory, provides an accurate relationship for the distance to the limit symbolized by d, which is interchangeable with the terms R and X in the foregoing equations. In this case, d is the length of the capillary.

It follows therefore that the active a real extent of the reservoir, that is, the area of the reservoir encompassed by an expanding circular wave as measured in a horizontal plane can be described as follows:

$$\text{ACTIVE RESERVOIR AREA} = 4 \cdot \pi \cdot \eta \cdot t \qquad(20)$$

The active area of the reservoir must assume a shape in accordance with the laws of thermodynamics. The surface or wave front will minimize its surface area automatically. In a reservoir that is confined between two sealing planes, the shape of the wave surface will be cylindrical. In an infinite medium it will be spherical. Infinitely thick reservoirs do not exist in nature. A reservoir with a single perforation will mimic spherical behavior for a short time. The wave front, once it encounters the upper and lower boundaries of the reservoir will dispose itself so as to minimize its active surface area, that is, it will assume a perpendicular disposition to the upper and lower sealing boundary surfaces, becoming a minimum orthogonal geometric function between them. This is the result of the second Law of Thermodynamics.

Similarly the cylindrical active reservoir volume, that is, the volume for a homogeneous reservoir of constant thickness h and encompassed by an expanding wave can be expressed by Equation (21) as follows:

$$\text{ACTIVE RESERVOIR VOLUME} = 4 \cdot \pi \cdot \Phi \cdot h \cdot \eta \cdot t \qquad(21)$$

It is to be noted that the expanding "bubble" wave is propagated with a constant amplitude or intensity ΔPc and the velocity of the wave front is inversely proportional to the square of the distance from the perturbation at the well. Also, the intensity of the capillary wave front remains constant at ΔPc, inversely analogous to the phenomenon of light such that light diminishes in intensity inversely as the square of the distance from a point source while the velocity of light remains constant.

For purposes of explanation, it is presumed that the capillary wave encounters one reservoir limit at a time. The existence of the limit is recognized at the well by information carried to the well bore by an inertial wave that functions to distribute energy between the wave front and the well bore along the capillary.

A combined form of the classic wave equation and the diffusion equation can be derived for each capillary as follows:

$$\frac{U_{actual} \cdot \phi \cdot \kappa \cdot \rho}{U_b \cdot \mu} \cdot \frac{\partial^2 P}{\partial t^2} + \frac{\partial P}{\partial t} = \eta \cdot \Delta^2 \cdot P \tag{22}$$

The inertial terms in this relationship are small but provide a theoretical basis for the rapid movement of pressure information behind the capillary rupture wave front. The coefficient of the wave equation provides a basis for estimating pressure pulse transmission velocity behind the wave front. The necessary redistribution of mass is small and the distances it must be moved are small. The transient pressure redistribution occurs quickly to maintain P constant. The relatively small value for the dynamic coefficient is small when compared with the hydraulic diffusivity. However, when integrated over the entire length of the capillary the inertia or momentum of the fluid in the capillary is exceedingly large. It is constructive to think of the fluid filled capillary as being a linear energy storage device.

The pressure distribution behind the capillary shock wave will respond rapidly to the advancing boundary by adjusting the flowing pressure gradient in the region between successive bubble shock waves. The pressure gradients in the vertical and transverse directions will be zero because of the absence of vertical and transverse flows. Equation (23) below gives the characteristic velocity of the dynamic waves that move between the bounding capillary waves in the radial direction from the well:

DYNAMIC WAVE VELOCITY=

$$\sqrt{\left(\frac{Ubulk}{(Uactual) \cdot \phi} \cdot \frac{1}{\rho \cdot \phi \cdot C_t}\right)} \tag{23}$$

For purposes of this analysis, the term $U_{actual}$ can be equated to $U_{wf}$ with the result:

$$U_{bulk} / (U_{actual} \cdot \phi) = 1 = A = U_b \phi \tag{24}$$

a velocity amplification ratio, which can be used to approximate the order of magnitude of the velocity. Realistic velocities are on the order of a few hundred feet per second in magnitude. In reality, the relationship of $U_{actual}$ to to $U_{bulk}$ will be a function of the reservoir formation and its pore-to-pore throat geometries. In this case we are seeking to develop an order of magnitude relationship between the velocity of the capillary shock wave or energy wave and the velocity of the small fluid redistribution pulses or energy waves in the open capillary channel behind it. Since Dynamic Mobility may be expressed as $M_v = \kappa \cdot \rho/\mu$, Equation (22) therefore becomes:

$$A \cdot M_v \cdot \frac{\partial^2 \cdot P}{\partial t^2} + \frac{\partial P}{\partial t} = \eta \frac{\partial^2 P}{\partial L^2} \tag{25}$$

With the continuity simplification that A=1, the Equation (25) can be rearranged as $$M_v \cdot \frac{\partial^2 \cdot P}{\partial t^2} + \frac{\partial P}{\partial t} = \eta \frac{\partial^2 P}{\partial L^2} \tag{26}$$

From this equation an approximate value for the velocity of the fluid communication through the length L open capillary can be developed from the coefficient of the wave portion of the equation as $$U_c = \sqrt{\frac{1}{\rho \phi C}} \tag{27}$$

It may be seen by substituting appropriate values for these properties that $$U_c >> U_{wf}$$

with $U_c$ being on the order of a few hundred feet per second and $U_{wf}$ on the order of a few hundred feet per hour. Thus the pressure distribution behind the wave rapidly adjusts to semi-steady state between shock waves.

Historically, data plots of pressure versus the semi logarithm of flow time or shut-in time have been used to graphically analyze well flow testing and it has been noted in the literature that these plots comprise discrete changes in slope and that these have been related to reservoir boundaries. Many investigators have examined the actual field data to discover that while the diffusion theory predicts long smooth functional transitions between slope changes, actual changes in pressure caused by the geologic limits of a reservoir as seen in nature are often sharp and abrupt. Furthermore, attempts to determine the distance between the well and the reservoir boundary limit associated with the change in slope by diffusion theory have resulted in calculations that indicate the distance between the well and the limit to be related as shown by equation (28):

$$d = .749 \sqrt{\eta \, t} \tag{28}$$

whereas the correct value for distance is, $d = 2\sqrt{\eta t}$, as expressed in equation (19) above.

Whenever a quantity of reservoir fluid is produced through the well bore, mass is redistributed in the active volume of the formation and energy is dissipated in the reservoir formation. In accordance with the Second Law of Thermodynamics which states that energy of a system will distribute itself uniformly throughout a bounded system, in a flow through porous media, the rate of hydraulic power dissipation will remain uniform through the active reservoir volume.

A statement of the Second Law of Thermodynamics as applied to a reservoir is expressed in equation (29) as follow $$\partial P / \partial t = q / (C_t V) \tag{29}$$

$\partial P/\partial t$ at will tend toward uniformity across the active region bounded by the capillary shock waves and the well bore, q is the flow rate from the well, V is the active volume of the reservoir and $C_t$ is the total system compressibility.

Equation (29), known as the productivity index equation where P is fluid pressure, shows that dP/dt will be constant over the active volume of the reservoir if volume and flow from the reservoir is constant for fluids of small compressibility. It can also be shown that Equation (29) is a result of Newton's Law for the conservation of momentum for a stable radial flow system, that is, radial flow across any circular boundary at any designated radius in the system with the flow rate into the well bore being directly proportional to the momentum of the zone of influence defined by the active flowing system.

The productivity index Equation (29) is a statement that energy in the bounded region is conserved, energy is distributed over the bounded region, and radial momentum is conserved. With the traditional understanding of assumed homogeneous reservoir properties and thickness, the distance relationship for the bounding wave, $d=2\sqrt{\eta t}$, can be incorporated into the productivity index relationship of equation (27) to derive the relationship $$\partial P/\partial t = q/(4\pi \cdot C_t h \cdot \eta \cdot t \cdot \phi) \tag{30}$$

By inserting the definition of hydraulic diffusivity into equation (30), equation (31) is derived which describes the semilog slope $M_1$ as a simple energy lump:

$$\Delta P = [q\mu/4\pi\kappa h] \cdot [\ln(t)] = M_1 \log(t) \tag{31}$$

The significance of the $M_1$ slope is not apparent until one discovers that $dP/d(\text{Log } t)$ is identically equal to 2.303 (t) dp/dt and the slope $M_1$ is proportional to power dissipation in the reservoir in the area immediately around the well bore. The first derivative of pressure with respect to time tends rapidly toward uniformity in the region bounded by the primary wave. The moving wave front boundary introduces a cross derivative between the fixed coordinate system and the coordinate system that travels with the primary wave resulting in a non-linear system of radial equations. However, because the velocity of the wave front with respect to the velocity of pressure communicating through the capillary is small, a simplifying assumption may be made that the pressure distribution between boundary shock waves tends toward a semi-steady energy state condition or that dP/dt is relatively constant throughout the region bounded by successive shock waves.

A value of the $M_1$ slope which is constant indicates that a region of constant power dissipation is forming behind the primary wave. The slow movement of the wave allows a condition of near semi steady energy state to exist behind it, that is, there is a substantially uniform decreasing gradation of reservoir pressure from the well to the wave front. The term dP/dt then becomes a direct indicator of a moving wave front encompassing a volume which is the productivity index value for the active reservoir volume. The primary shock wave acts as the outer reservoir boundary. The well bore is the inner boundary.

Figure 3:
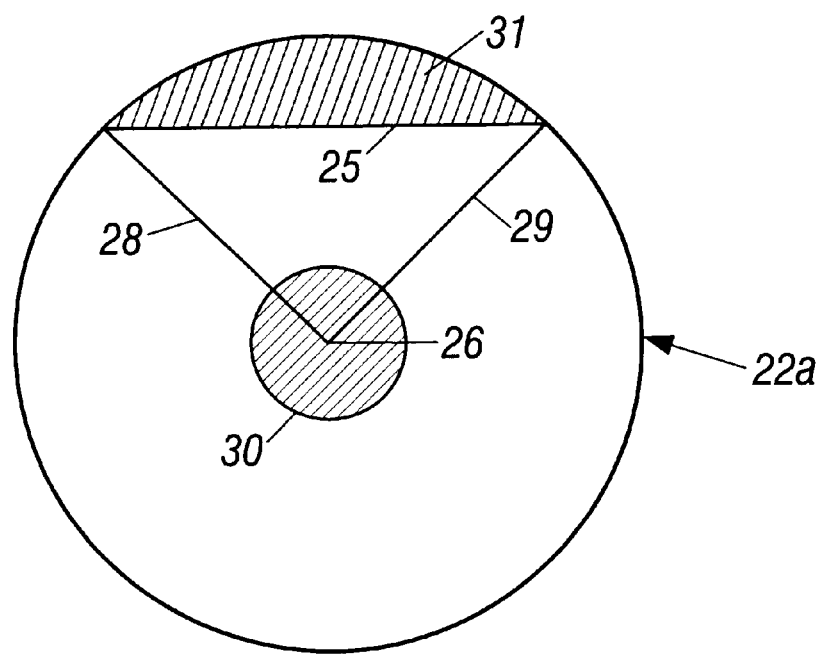
FIG. 3 is a schematic diagram of a circular capillary wave front expanding in a horizontal plane concentrically outward in a reservoir from a well bore which extends into the reservoir.

At the time the first boundary limit is encountered by the primary wave, the sum total of the flows from each capillary segment around the well becomes imbalanced. The truncated non-growing radials produce less flow than the growing radials as the truncated radials attempt to maintain a uniform distribution of power dissipation, such that $$\text{power dissipation} = \frac{\partial P}{\partial t} \cdot V = \frac{dP}{dt} \cdot \phi \cdot h \cdot 4\pi \cdot \eta \cdot t \tag{32}$$

and $$\frac{M}{2.303} = t\frac{dp}{dt} \tag{33}$$

throughout the region. As the acting system grows, there will be a decrease in fluid flux from the non-growing radial capillary segments. The reservoir must continue to observe thermodynamic balance for both the first and second laws of thermodynamics and the conservation of momentum. The well at constant flow rate demands more production while the growth in active reservoir volume is eclipsed by the permeability limit. At this point, the reservoir will maintain constant power dissipation according to the second law of thermodynamics and will maintain reservoir energy through a pressure, volume, mass, and energy balance for the entire reservoir according to the first law of thermodynamics. Newton's Laws for Conservation of Momentum are also observed to maintain a dynamic balance of fluid forces acting through the well. The asymmetry of the reservoir due to the permeability limit results in the generation of a secondary region of draw down around the bore of the flowing well to maintain all of the required balances in the reservoir. The abrupt change in flow from the reservoir results in the generation of a secondary capillary shock wave. The sudden change in flow through the capillary results in a readjustment of the electronic forces present at each pore throat. The new active reservoir volume grows symmetrically and in proportion to the growth of the entire reservoir relative to the size of the active reservoir at the time the limit was encountered. The reservoir volume continues to grow in two distinct regions of constant power dissipation or constant M. The intensity of the lost productive energy growth at the boundary results from the focusing of the energy loss through the radial segment subtended by the no-flow limit. FIG. 3 graphically demonstrates the reflection mechanism, showing an expanding circular shock wave with wave front 22a as it impacts with a straight section 25 of the reservoir boundary and the spreading points of impact being joined to the well 26 by truncating radials 28, 29. A secondary capillary shock wave with expanding circular wave front 30 is generated to maintain the required energy balance for the reservoir.

The flow contribution of $\Delta q$ from a non-growing radial capillary segment is described in the following relation (34) obtained from a combination of equations (19) and (30):

$$\Delta q = [\partial P/\partial t] \cdot C_t \cdot h \cdot \phi \cdot \Delta \theta \cdot d^2 \tag{34}$$

where $\tag{35}$
$\partial P/\partial t = [M_1 \cdot R_1/2.303_t]$ where

It will then be apparent that as soon as d becomes constant for the segment then the flow will diminish as the reciprocal of time.

The reflection mechanism can be understood by considering that each secondary wave is moving up a potential hill and will retrace the reservoir volume traversed previously by the primary wave. Because the velocity of the primary wave is a function of time and hydraulic diffusivity, the secondary wave is a function of hydraulic diffusivity, time, and the time of secondary wave initiation.

The First Law of Thermodynamics, which states that energy in a closed system is conserved, can be applied to the geologic reservoir under consideration as the conservation of distributed power over the active reservoir, or that volume of the reservoir encompassed by the circular capillary wave.

Equation (36) is the relationship for the power distribution integrated over the reservoir:

$$[dP/dt] \cdot \text{Volume} = \text{Flow}/\text{Total Compressibility}. \tag{36}$$

Restated in terms of the primary kinematic wave:

$$[dP/dt] \cdot \phi h 4\pi\eta = q/(C_t \cdot t) \tag{37}$$

or $$[dP/dt] \cdot t = q/(C_t dV/dt) = M_1/2.303 \tag{38}$$

The value $M_1$ represents the constant rate of power dissipation for the entire active reservoir system. As such, it must be satisfied for each segment of the reservoir. Equation (39) demonstrates the relationship that each flow contribution from each segment must satisfy to maintain a balance:

$$q_1/[dV_1/dt] = q_2/[dV_2/dt] = q_0/[dV_0/dt] \tag{39}$$

The flow contribution from the sectional segment lost to the productive volume due to the circle segment section 31 as shown in FIG. 3 can be described by Equation (40):

$$q_1 = q_0[dV_1/dt]/[dV_0/dt] \tag{40}$$

Having satisfied the First Law of Thermodynamics, the Second Law of Thermodynamics must be satisfied as well. The depletion or dissipation of energy throughout each segment of each of the regions must be satisfied. This is described by Equation (41):

$$q_1/[V_1 + V_3] = q_2/V_2 = q_3/V_2 = q_3/V_3 = [dp/dt][C_t] \tag{41}$$

Rearranging terms one can arrive at the Second Law balance between the flow form region in the form of Equation (42):

$$q_2 = q_1 \cdot V_2/[V_1 + V_3] \tag{42}$$

By combining Equations (40) and (42) the resulting Equation (43) describes the flow imputed from the secondary flow volume to replace the lost contribution at the boundary. This is accomplished in a manner consistent with the First and Second Laws of Thermodynamics within the constraints of the orderly expansion of the active flow region of the reservoir as it develops behind the primary capillary kinematic wave.

$$q_2 = (q_0 \cdot V_2 dV_1/dt)/[(V_1 + V_3) \cdot (dV_0/dt)] \tag{43}$$

The next step is to calculate the pressure depletion contributed to the well by this loss of contributed flow. The secondary demand on the well is then added to the original field depletion to achieve the pressure draw down generated behind the secondary wave. Equation (44) describes the pressure depletion contribution to the secondary field:

$$P_2 = \int_{t_1}^{t} \left(\frac{q_2}{C_t V_2}\right) dt \tag{44}$$

Combining (43) and (44), then simplifying terms, the volumes for the secondary region identically cancel. To simplify further, it can be shown that Equation (44) holds as an identity for the geometric properties for the circular primary capillary kinematic wave front as it strikes a straight limit:

$$[dV_1/dt]/(V_1 + V_3) = 1/t \tag{45}$$

Thus the integral becomes identically the same as for the primary wave except for the limits of integration. The term $\Delta P(t)$ includes skin effect and is referenced to the original pressure $P_i$. This convention is common and simplifies the writing of equations. The skin term changes sign for drawdowns and buildups and becomes tedious to carry in equation manipulations. Pressure losses due to skin are contemplated in this disclosure. The solution becomes:

$$\Delta P(t) = [(q_0/(\phi C_t h 4\pi\eta)]\ln(t/t_1) = M_1 \log(t/t_1) \tag{46}$$

The reflection of wave intensity can be calculated by the addition of the effects of the two fields encompassed by the primary wave and the secondary wave. Equation (47) demonstrates this for the single straight limit:

$$\Delta P(t) - M_1 \log(t/t_1) + M_1 \log(t) = 2M_1 \log(t) - M_1 \log(t_1). \tag{47}$$

This summation produces the pressure (power) depletion relationship for the field behind the secondary wave. The change in slope in the pressure vs. time plot is an exact doubling for a straight limit because the reflection path generated by the open flow paths focus the energy back to the well where it acts upon a region growing in synchronization with the growth of the active reservoir. The capillary waves are kinematic in that they are solely a function of hydraulic diffusivity and their time of initiation. The semilog plot magnifies these reflections.

Thinning of pay in all directions from the well will show up only in the late stages of the test as the reservoir as a whole approaches semi-steady state, that is, when all of the capillary radials cease to grow.

For the straight line boundary limit, the implication is that the change of $M_1$ appears to double to a new value $M_2$ where $$M_2 = 2 \cdot dP/dt \cdot t \cdot 2.303 \tag{48}$$

and the apparent rate of active flow region growth about the well is cut in half.

At the well bore, the system momentum can be described for a situation of constant mass flux from the well bore in a simple manner. The velocity at the well bore may be expressed as:

$$U_{wb} = q/(2\pi \cdot r_w \cdot h) \tag{49}$$

The mass of the system is the active reservoir volume, V, times the density of the reservoir fluid, $\rho$. The system mass is changing while the velocity remains constant at the well bore, a phenomenon analogous to that of a rocket motor, wherein the motor acquires fuel mass instead of expending it. The forces imposed on the system are nil. It is growing as an expanding system. Equation (50) is the momentum balance at the well bore:

$$\text{Mass} \cdot U_{wb} = \rho \cdot V \cdot q / (2\pi \cdot r_w \cdot h) \tag{50}$$

Newton's Law for this freely expanding system may be written as Equation (51):

$$\partial(\text{Mass} \cdot U_{wb})/\partial t = [(\partial p/\partial t \cdot V) + (\partial V/\partial t \cdot p)][q/(2\pi \cdot r_w \cdot h)] = 0 \tag{51}$$

This may be rearranged in the form of Equation (52) in which the definition of compressibility is introduced:

$$1/\rho \cdot \partial \rho/\partial t = -1/V \cdot [\partial V/\partial t] = C_t(\partial p/\partial t) \tag{52}$$

If the negative sign in Equation (52) is changed to reflect production as positive for q, then Equation (53) emerges as the familiar productivity index equation:

$$\partial P/\partial t = q/(C_t V) \tag{53}$$

This exercise demonstrates the importance of constant rate testing in maintaining the dynamic balance of the system. With a constant flow rate from the well, the dynamics of the system remain in balance. When a limit is encountered by a capillary, the capillary ceases to grow. The considerable momentum of the fluid in the capillary is maintained. The hypothetical reflection posed in conventional diffusion theory is a physical non sequitur. In fact, the well experiences a loss of fluid delivery from the region of non growing capillaries as they attempt to maintain constant fluid power dissipation rate and radial momentum. System balance must be maintained while demand upon the system for constant flow to the well must also be maintained. The loss of active reservoir volume not gained at the boundary is compensated for by an increasing depletion rate near the well bore. The sudden increased demand on the system results in a necessary readjustment of capillary electronic forces to allow additional fluid passage into the well bore and generates a second shock wave which begins to move in a relativistic fashion, that is, it moves at its undisturbed media velocity against the existing flow field. The secondary capillary wave becomes a boundary for the secondary field thus formed about the well bore. The secondary wave and the field that it defines is balanced in all respects just as the primary wave and field are balanced. The radial memory of the stream lines maintains radial balance. The secondary wave can continue to grow until it too strikes the limit and regenerates a tertiary wave while system energy and dynamic balances are maintained.

The well acts as a focal point or a lens to maintain balance according to the laws of physics. An analogy comparing streamlines to light rays is very useful to understanding the imaging that occurs in the course of applying the "Bubble" or "Petroporokinekinetics" theory described herein. The communication through the well bore allows the non-growing capillary radials to deplete symmetrically with the growing radials in the same depletion region defined by the primary wave and the secondary wave. These energy bands of dissipation or pressure depletion segments point to the capillary waves much the same way that the tail of a comet points to the head. The capillary secondary waves provide succeeding boundaries to define each region of discretely lost growth as each limit is encountered.

It has been observed that the early flow of a well when first opened is restricted by a limiting physical constraint upon flow-through porous media that is related to choked flow or turbulent flow. The shock wave initially moves with a limiting velocity which is far slower than the hypothetical diffusion velocity that would be required to maintain a constant areal growth rate. The result is that the volume of the reservoir which is encompassed by the shock wave increases from the well bore as a function of the square of the limiting velocity times the flow time. This phenomenon is in evidence on the pressure-time semilog chart as a distortion of the slope and does not represent $M_1$. The square of the log of $\Delta P$ plotted versus the square of the log of $\Delta t$ can be used to detect values of slope which are not to be properly construed as the slope $M_1$.

A reservoir's boundary limits are defined by a sharp transition in hydraulic diffusivity of the geologic formations. Generally, a one order of magnitude reduction in hydraulic diffusivity will produce a reflection which signifies the presence of a limit. When the primary capillary shock wave first strikes the limit, "Bubble Theory" predicts that those capillaries striking the permeability limit will begin to reduce their flow contribution to the well relative to the still growing capillaries in the infinite acting radial regions. Although the well at constant flow rate demands more production while the growth in active reservoir volume is eclipsed by the permeability limit, the apparent asymmetry of the reservoir due to wave interference upon contact with a discrete section of the reservoir boundary limit results in the generation of a secondary circular capillary wave and a secondary region of fluid draw down centered around the bore of the flowing well and expanding outwardly to maintain all of the required balances in the reservoir, such as the maintenance of reservoir energy through a pressure, volume, mass and energy balance for the entire reservoir according to the First Law of Thermodynamics, and the maintenance of constant energy (pressure) dissipation and dynamic balance of fluid forces acting through the well in accordance with the second Law of Thermodynamics and Newton's Law for Conservation of Momentum.

On a geologist's map of the reservoir, a discrete section of boundary limit or reflector can be defined geometrically as the locus of points at the edge of the flow field between the extremities of two truncating radials each emanating from the well at an angle to the radial to the initial point of boundary contact which is located therebetween. However, the limit is not an active reflector until the primary wave has reached it and the mechanical energy not gained by the primary wave is focused back into the well and forms the secondary energy depletion region.

The reflecting boundary limit can also be considered to be formed of a plurality of discrete limits, each located between a pair of truncating radials. The secondary regions that are formed are ordered in the precedence with which the primary wave strikes each limit. Because the reservoir is divided by memory streamlines or capillary membranes formed by the expanding capillary rupture shock wave, the active reservoir and the well pressure are sensitive only to the angular disposition of those capillaries which are no longer growing in length and the angular rate at which those remaining growing capillaries cease to grow. Deviations in the curvature of the reflecting face of the reservoir limit results in variations in the angular relationship of capillary growth termination with time. Because this is a time vs. angle relationship it is possible to deal with variations of the reflecting boundary as related to corresponding changes in reflected intensity.

Figure 4:
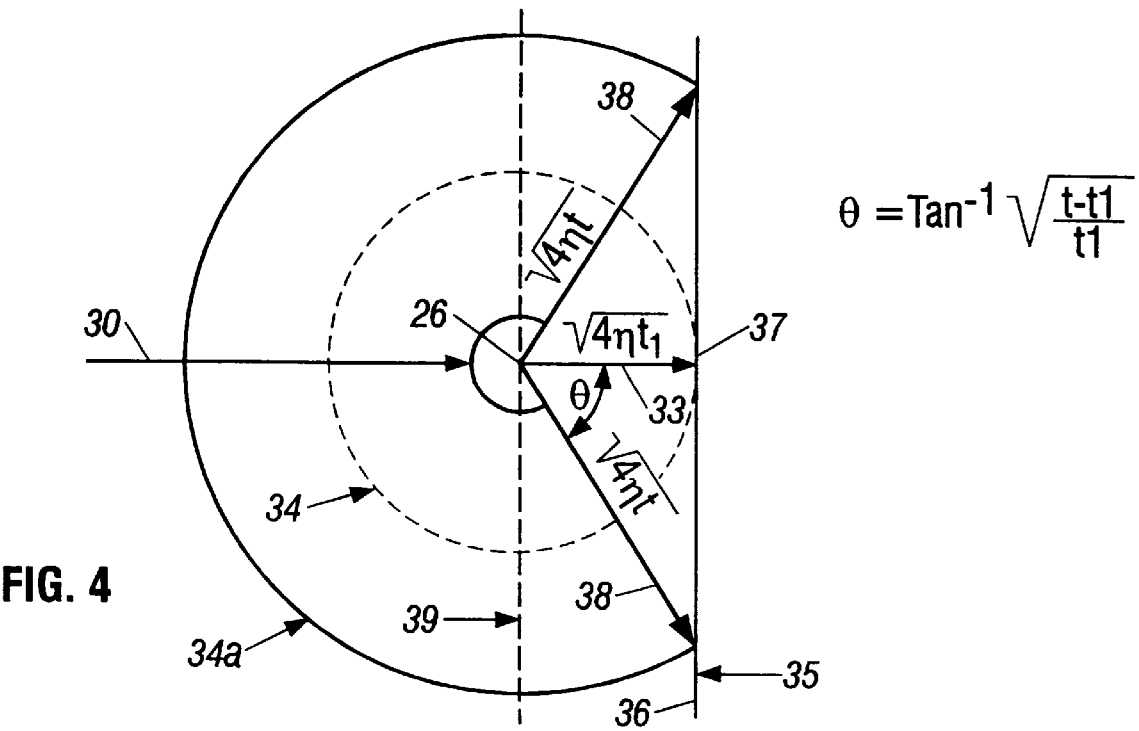
FIG. 4 is a diagram similar to FIG. 3 and showing a discrete section of a reservoir boundary limit which is defined by a pair of truncating radials extending from the well bore to the diverging points of contact of the expanding wave with the boundary limit.

As evidenced in the pressure versus time semilog plot, each newly encountered straight no-flow boundary limit is heralded by a two to one increase in magnitude of the slope of the function, oftentimes preceded by a small step drop in pressure at the well then followed by a short term dynamic that settles into the new increased semilog slope. As viewed from the well 26a, as shown in FIG. 4, one can deal with the reflector in terms of contributing right and left hand sides with respect to the radial 33 to the point of contact 37 with the boundary limit. If viewed in terms of equally contributing right and left hand sides, as shown in FIG. 4 wherein the radial 33 from the well 26a is perpendicular to a tangent line 36, tangent to the expanding circular shock wave 34 at the point of contact 37, and a pair of truncating radials 38 define the extent of wave impact of the expanded wave 34a with the limit, which in FIG. 4 is a straight line boundary 35 coincident with tangent 36, an open angular growing section of capillaries can be added or subtracted from between those right angle sections without prejudice to the original solution. This results in the generation of a secondary shock wave 30 and a contribution to growing reservoir energy that is proportional to the ratio of $M_2/M_1$. Before striking the boundary, the expanding primary wave covers a region of the reservoir wherein the pressure vs. time curve displays a constant $M_1$ slope. After striking the boundary, the expansion of the secondary wave is coincident with a constant $M_2$ slope where $M_2$ is the changed persisting slope of the pressure vs. time curve after the primary capillary shock wave has made its initial impact with a section of the reservoir boundary.

Figure 5A:
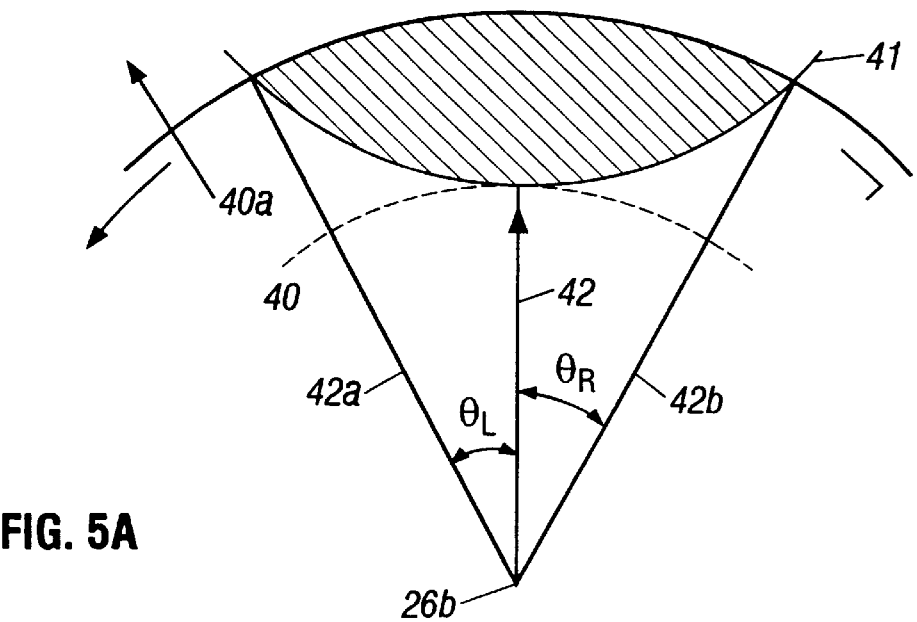
FIG. 5(a) is a schematic diagram showing a portion of a geologic reservoir and a capillary wave expanding concentrically with respect to a well bore in the reservoir and impacting a discrete section of the reservoir boundary wherein the section is convex in shape.

In FIG. 5(a) there is shown an expanding capillary wave 40 which is expanding concentrically with respect to a well bore 26b in a geologic reservoir and is making initial impact with a discrete section 41 of the reservoir boundary limit wherein the section is convex in shape. The distance from the well bore 26b is represented by the distance radial 42 to the initial point of contact with the boundary. As the wave continues its expansion as represented by the wave front 40a, the most recent points of contact of the wave with the boundary may be joined to the well bore 26b by a pair of truncating radials 42a, 42b. If the boundary 41 is an image shown on a geologist's map of the reservoir, the angles $\Theta_L$ and $\Theta_R$ which the left and right truncating radials define with the distance radial 42 may be directly measured from the map. The lengths of the truncating radials are equal to $\sqrt{(4\eta t)}$ and the length of the distance radial 42 is equal to $\sqrt{(4\eta t_1)}$ The integration of the rate of growth of the reservoir area which is not gained divided by the area of the segment no longer growing is a difficult and tedious problem. Its value, however, can be developed graphically by the geometric construction that compares reality with a hypothetical value for a straight boundary encountered by the expanding capillary wave at the same time as the curved real boundary.

Figure 5B:
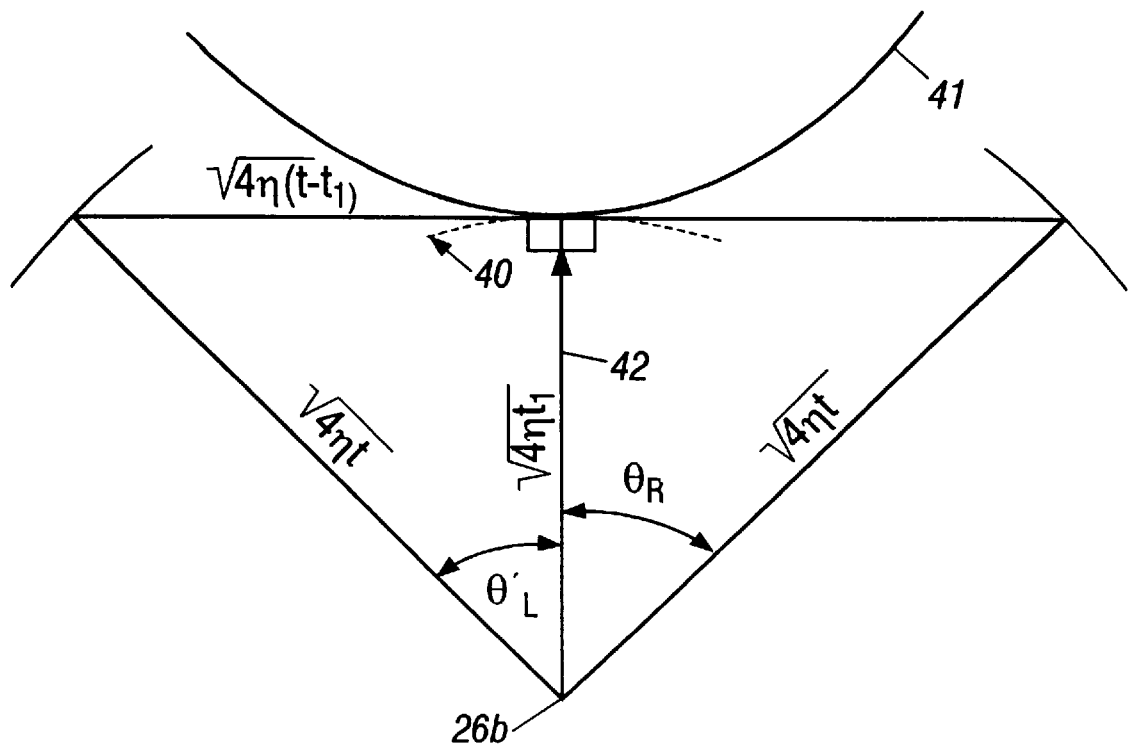
FIG. 5(b) is a schematic diagram showing the convex section of reservoir boundary of FIG. 5(a) wherein a hypothetical straight line boundary is superimposed in tangential relation to the expanding wave at the point of contact with the boundary and is perpendicular to the distance radial from the well bore.

FIG. 5b is a schematic diagram, similar to FIG. 5a, which shows an expanding shock wave striking a convex limit but with a hypothetical straight line boundary and geometric construction similar to FIG. 4 superposed thereon. In FIG. 5b it is seen that the distance radial 42 impacts the hypothetical straight line in perpendicular relation and with the hypothetical boundary and truncating radials forms a pair of right triangles, each with the distance radial 42 as a common side of length equal to $\sqrt{(4\eta t_1)}$ and a hypotenuse represented by a truncating radial of length equal to $\sqrt{(4\eta t)}$. The hypothetical angular displacements $\Theta_L'$ and $\Theta_R'$ differ from the angular displacements $\Theta_L$ and $\Theta_R$ as measured on a geologist's map.

Figure 5C:
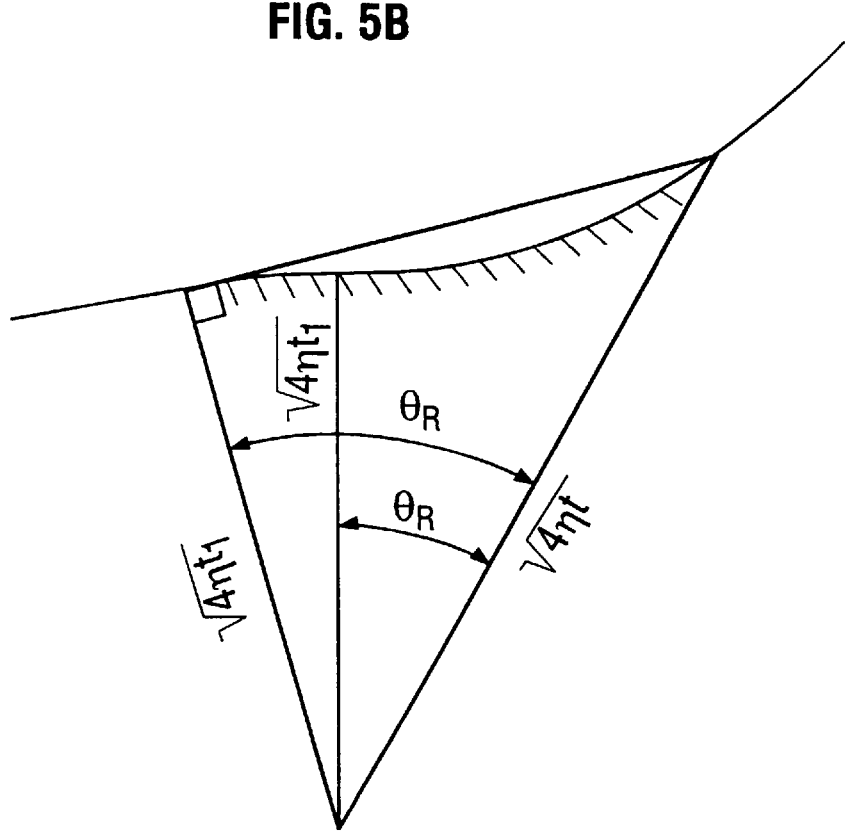
FIG. 5(c) is a schematic diagram corresponding to FIGS. 5(a) and 5(b) but with a geometric construction drawn thereon for showing angles of displacement of radii drawn to the mapped reservoir boundary from radii drawn to the hypothetical straight line boundary.

For enabling a comparison of hypothetical angular displacements with the angular displacements displayed on a geologist's map, the right triangle which includes $\Theta_R'$ is displaced on the graphical plot by angular rotation about its vertex at the well location by an amount such that its vertex formed by the hypotenuse and straight line boundary makes contact with the convex boundary. The resulting construction shown in FIG. 5c displays the angles $\Theta_R'$ and $\Theta_R$ and the angle $\Theta_R'$-$\theta_R$ which is the displacement caused by the deviation of the geologist's boundary from a hypothetical straight boundary. The difference in the angles for $\Theta_R'$-$\Theta_R$ is designated as the angle $\alpha$ depicted in FIG. 5d. The angle $\alpha$ may be projected through the well to describe the equivalent energy contribution of the curvature of the boundary. Because the rate of reservoir growth for this convex boundary is greater than the rate of growth that would be contributed by a hypothetical straight boundary, the rate of growth is increased by an equivalent segment of radius $\sqrt{/(4\eta t)}$ and angle of displacement $\alpha=\Theta_R'$-$\Theta_R$.

In similar fashion, the left triangle which includes $\Theta_L'$ as shown in FIG. 5b may be displaced such that its vertex opposite the distance radial makes contact with the convex boundary. From the graphical construction, it is apparent that $$\theta_L' = \operatorname{Tan}^{-1}\sqrt{\frac{t-t_1}{t_1}} = \theta_R' \tag{54}$$

Since $\Theta_L'=\Theta_R'$ is a hypothetical reference, we can write $$\Theta_L' = \Theta_R' = \Theta \text{ and } \beta = \Theta_L' - \Theta_L.$$

It follows that $$\Theta_R' - \Theta_R + \Theta_L' - \Theta_L = \alpha + \beta \tag{55}$$

$$\Theta_R' + \Theta_L' + \Theta_R + \Theta_L = 2\Theta - (\Theta_R + \Theta_L) = \alpha + \beta. \tag{56}$$

or

But $\Theta_R+\Theta_L$ is the angle between the truncating radii and can be expressed as $$\Theta_R + \Theta_L = \Delta\Theta \tag{57}$$

Therefore, $$\Delta\Theta = 2\Theta - (\alpha + \beta) \tag{58}$$

or (59)

$$\alpha + \beta = 2\Theta - \Delta\Theta.$$

or

Figure 5D:
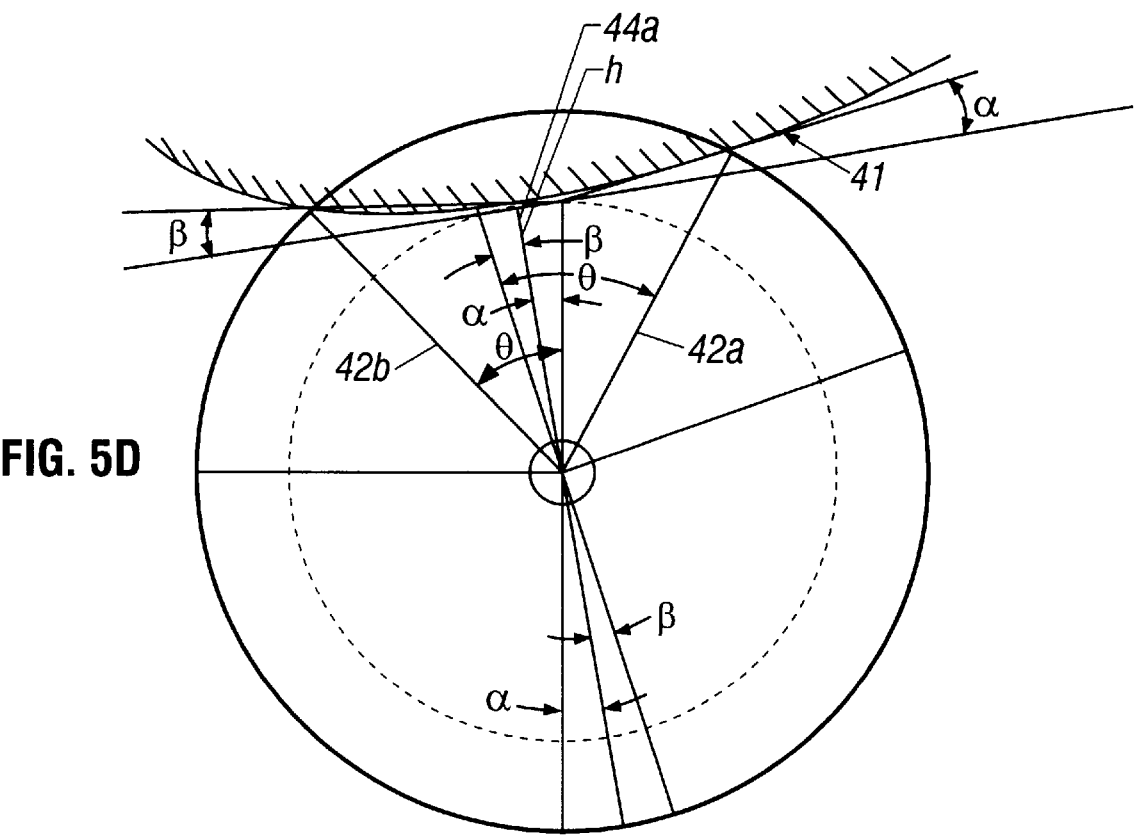
FIG. 5(d) is a schematic diagram showing the same reservoir and convex section of reservoir boundary in FIG. 5(c) with a geometric construction drawn thereon as an aid for deriving a value $\alpha+\beta$, corresponding to the curvature of the convex section.
Figure 6:
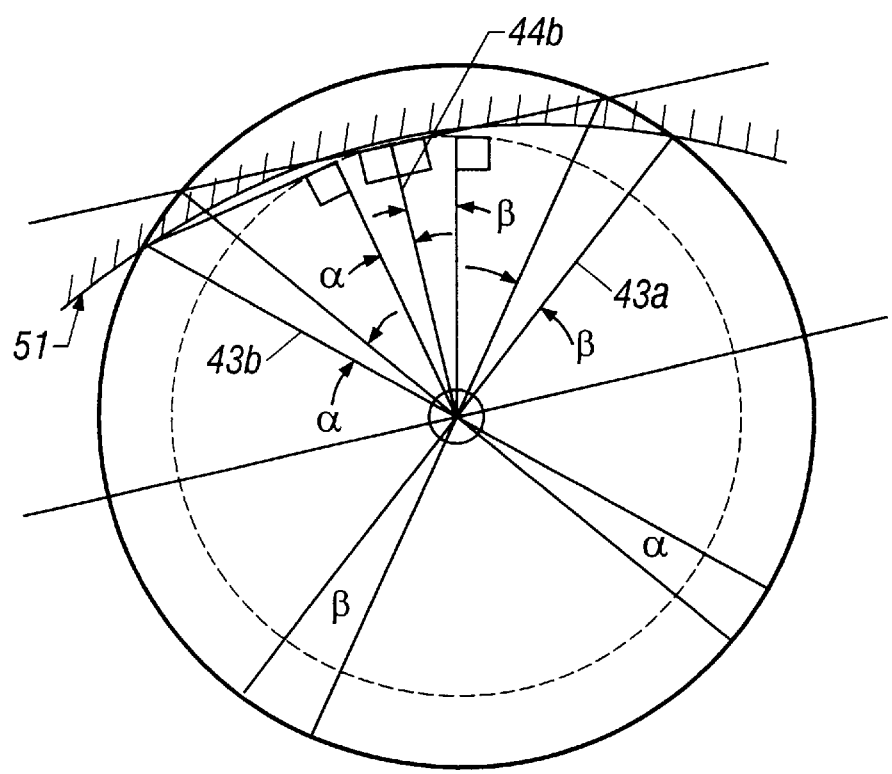
FIG. 6 is a schematic diagram similar to FIG. 5(d) but wherein the capillary wave is impacting a discrete section of the reservoir boundary limit wherein the section is concave.

As the capillary radials are terminated by variable limit geometry, the back projected value of $M_2$ can provide relative angular displacement. The value $M_2$ can be used to compute a point to point angular displacement or the sum of the angles $\alpha$ plus $\beta$ in the configurations for convex and concave limits as shown in FIGS. 5(d) and 6, respectively, wherein the angles $\alpha$ and $\beta$ represent the respective angular displacements. In both cases the sum of $\alpha$ plus $\beta$ is the same. It is the angular contribution of apparent flow influx that is controlled by the $M_1/M_2$ ratio, which ratio responds to the rate of termination of growing radii.

From the pressure vs. time curve obtained from pressure data in a well to the reservoir in which a capillary shock wave has been generated by the initiation of well flow it is also possible to obtain a value for $\alpha+\beta$ for each of the discrete reservoir limits detected by an abrupt persisting change in the slope M.

Since $$M = \frac{q}{C\left(\frac{dv}{dt}\right)} \tag{60}$$

for a straight boundary, the following relations hold for $M_1$ and $M_2$:

$$M_1 = \frac{q}{C\left(\frac{dv}{dt}\right)} \tag{61}$$

and $$M_2 = \frac{q}{C\left(\frac{dv}{dt}\right)\left(\frac{\pi}{2\pi}\right)} \tag{62}$$

For a convex surface with angular displacements from the tangent of $\alpha$ and $\beta$, $$M_2 = \frac{q}{C\left(\frac{dv}{dt}\right)\left(\frac{\pi+\alpha+\beta}{2\pi}\right)} \tag{63}$$

With reference to equations (36) through (38), it can be shown that:

$$\left(\frac{dv}{dt_1}\right) = \phi \cdot h \cdot 4 \cdot \pi \cdot \eta \cdot t = (2\pi)\phi \cdot h \cdot 2 \cdot \eta \cdot t \tag{64}$$

$$\left(\frac{dv'}{dt_2}\right) = \phi \cdot h \cdot 2 \cdot \pi \cdot \eta \cdot t = (\pi)\phi \cdot h \cdot 2 \cdot \eta \cdot t \tag{65}$$

and $$\frac{dV}{dt_2} = (\pi + \alpha + \beta)\phi \cdot h \cdot 2 \cdot \eta \cdot t \tag{66}$$

Therefore, the following relation is obtained:

$$\frac{\frac{dV}{dt_2}}{\frac{dV}{dt_1}} = \frac{\pi+\alpha+\beta}{2\pi} \tag{67}$$

Accordingly, $$M_2 = \frac{q}{C \cdot \frac{dV}{dt_2}} = \frac{q}{C\left(\frac{\pi+\alpha+\beta}{2\pi}\right)\left(\frac{dV}{dt_1}\right)} \tag{68}$$

and $$M_2 = \left(\frac{\pi+\alpha+\beta}{2\pi}\right)\frac{q}{C\left(\frac{dV}{dt_1}\right)} = M_1 \tag{69}$$

Therefore $$\left(\frac{M_1}{M_2}\right) = \frac{\pi+\alpha+\beta}{2\pi} \tag{70}$$

and $$\alpha + \beta = 2\pi \cdot \frac{M_1}{M_2} - \pi \tag{71}$$

The value of $\alpha+\beta$ obtained for a limit detected on the pressure vs. time curve is therefore available along with values of distance d for comparison with values of $\alpha+\beta$ and d derived from the geologist's map. This is called curvature or angle of diffraction and it represents the angle of displacement from the tangent line by a line from a point of contact on the boundary projected back to the circle of tangency.

For the straight line boundary limit as shown in FIG. 4, an apparent boundary reflection plane 39 can be drawn through the center of the well and parallel to the straight face of the reservoir boundary section. For such case, $2\pi \cdot M_1/M_2$=Angle AFA, which is equal to $\pi$ or $$2\pi \cdot M_1/M_2 = \pi \tag{72}$$

For the convex boundary limit 41 shown in FIG. 5(d), it can be shown that $$\pi+\alpha+\beta = AFA = 2\pi \cdot M_1/M_2 \tag{73}$$

and that $M_1/M_2<2$ or $M_1/M_2>\frac{1}{2}$. It is then to be seen that for the straight line boundary, $M_2=2M_1$ and for a convex boundary, $M_2$ (2$M_1$.

For a concave boundary limit 51 as shown in FIG. 6, it can be shown that $$\pi-\alpha-\beta = AFA = 2\pi \cdot M_1/M_2 \tag{74}$$

and that $M_1/M_2(\frac{1}{2}$, or $M_2)2M_1$.

It is thus to be noted that the curvature of the boundary limit is defined by the sum of the angles $\alpha$ plus $\beta$ and the curved boundary is non-unique in spatial relationship and relative location with respect to the well. For purposes of geologic interpretation and creation of an image of the reservoir boundary, the boundary limit with such curvature, and at a calculated distance d from the well as noted from the time of wave travel to the initial point of contact and tangency can be re-positioned to obtain a best fit with other discrete sections of reservoir boundary so long as such re-positioning does not create a second limit geometrically. Obviously, as more limits are detected by observation of abrupt slope changes in the pressure vs. time data curve, the more restrictive the possible locations and re-positioning of the curved boundary becomes.

Figure 14:
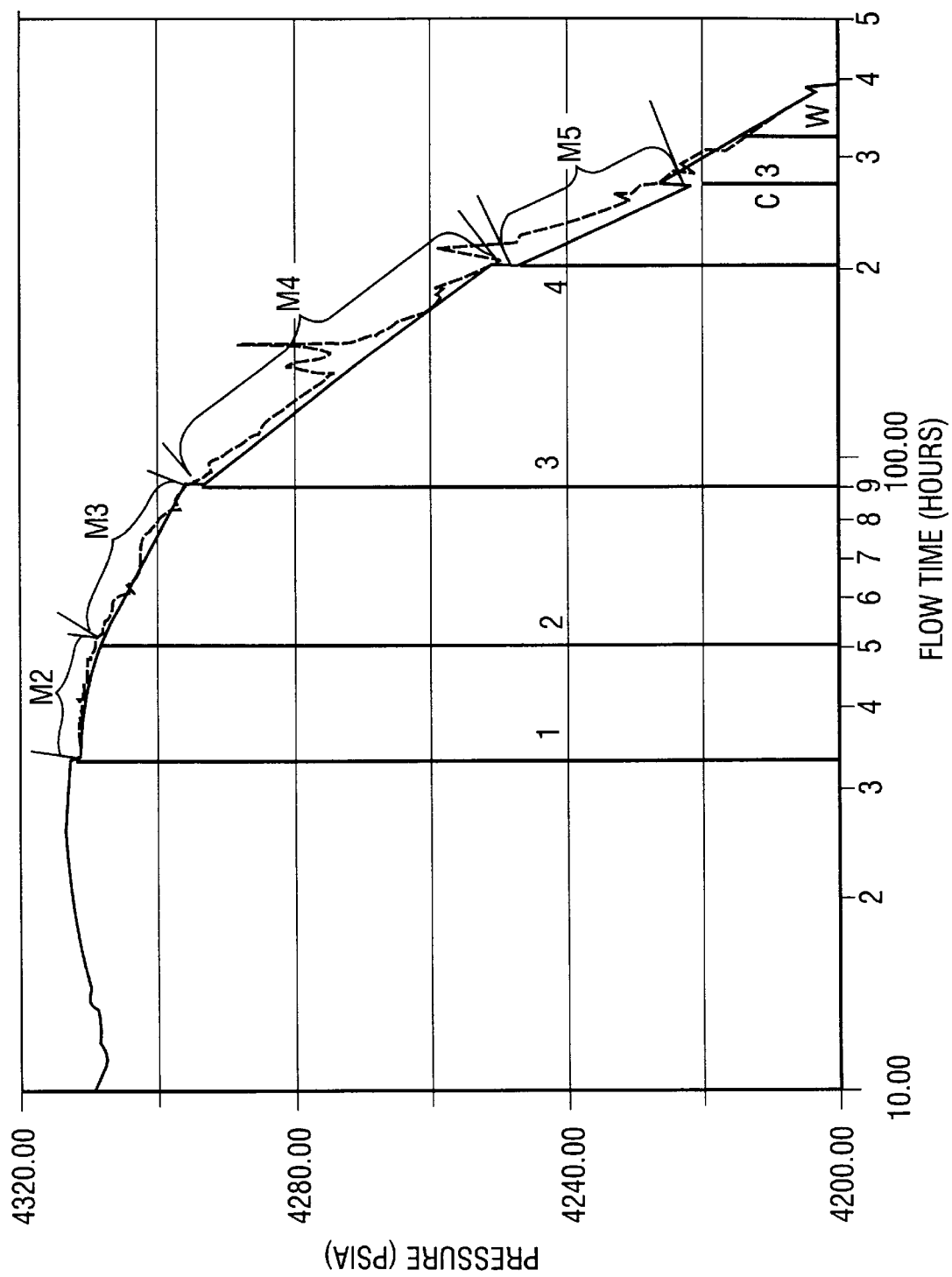
FIG. 14 shows the plot of FIG. 13 with slope lines added thereto having abrupt changes in slope of the pressure vs. time curve caused by the arrival of a capillary shock wave at different discrete sections of the reservoir boundary.

It is also to be noted that the pair of truncating radials associated with a discrete section of the boundary define an angle therebetween so long as the wave front is impacting the discrete section of boundary. From the pressure vs. time plot, the end of a section of the curve having a given slope $M_i$ and at a greater distance from the well than the distance radial will limit the spread of the truncating radials. It is also to be appreciated that the variables in the plot of pressure vs. time may both be linear although a plot which uses the logarithm of time as shown in FIG. 14 or the square root of time is more effective in displaying a change of slope when the shock wave impacts a discrete section of the reservoir boundary.

For some reservoirs, the testing of a well to develop a pressure versus time record and the duration of such a test may become an economic issue. As an aid in resolving the issue it is possible to generate a predictive pressure versus time curve from a geologist's map of the reservoir.

The process for creating a pressure vs. time curve from the geologist's map is a matter of a few steps as enumerated below to calculate the $\alpha+\beta$ angles for each limit at any point in time. The process is as follows:

(1) The geologist's map is superimposed upon a radial plot grid with the well located at its center. The nearest point on the reservoir boundary is located and this becomes fixed tangent radial number 1.

(2) Each successive point of contact with a different discrete section of boundary is located and designated as limit 2, limit 3, and so on.

(3) The farthest point is the closure corner. For simplicity, it is designated as the 0° radial on the chart.

(4) The other corners are then located. These corners are where truncating radii from adjacent limits come together.

(5) For simplicity, the boundary function in radial coordinates will be a maxima at each corner and a minima at each tangent radial. Since the boundary is a closed function, there will be an equal number of maxima and minima.

(6) Each discrete limit will be represented by a tangent radial (minima) and two corners (maxima) shared with other limits. Radii are selected at points (times and corresponding radii) of interest. A table is then constructed for each discrete limit with all of the times of interest included so that a composite of all limit contributions at those times can be made whether encountered by the primary wave or not at that time.

(7) By direct measurement the two truncating radial for each limit can be measured for each radius by listing the corresponding $\Theta$ in the table.

(8) A $\Delta\Theta$ can be computed and hence the $\alpha+\beta$ for each limit at any time can be computed.

(9) These may be assembled to develop a value for M at each time.

(10) The M's can be numerically integrated to produce a predictive pressure curve.

The plot of pressure versus the semilog of time demonstrates the gain of confirmed reservoir volume directly proportional to time. This corresponds to a growing circle or segment thereof which is expanding in concentric relation to the well.

Figure 15:
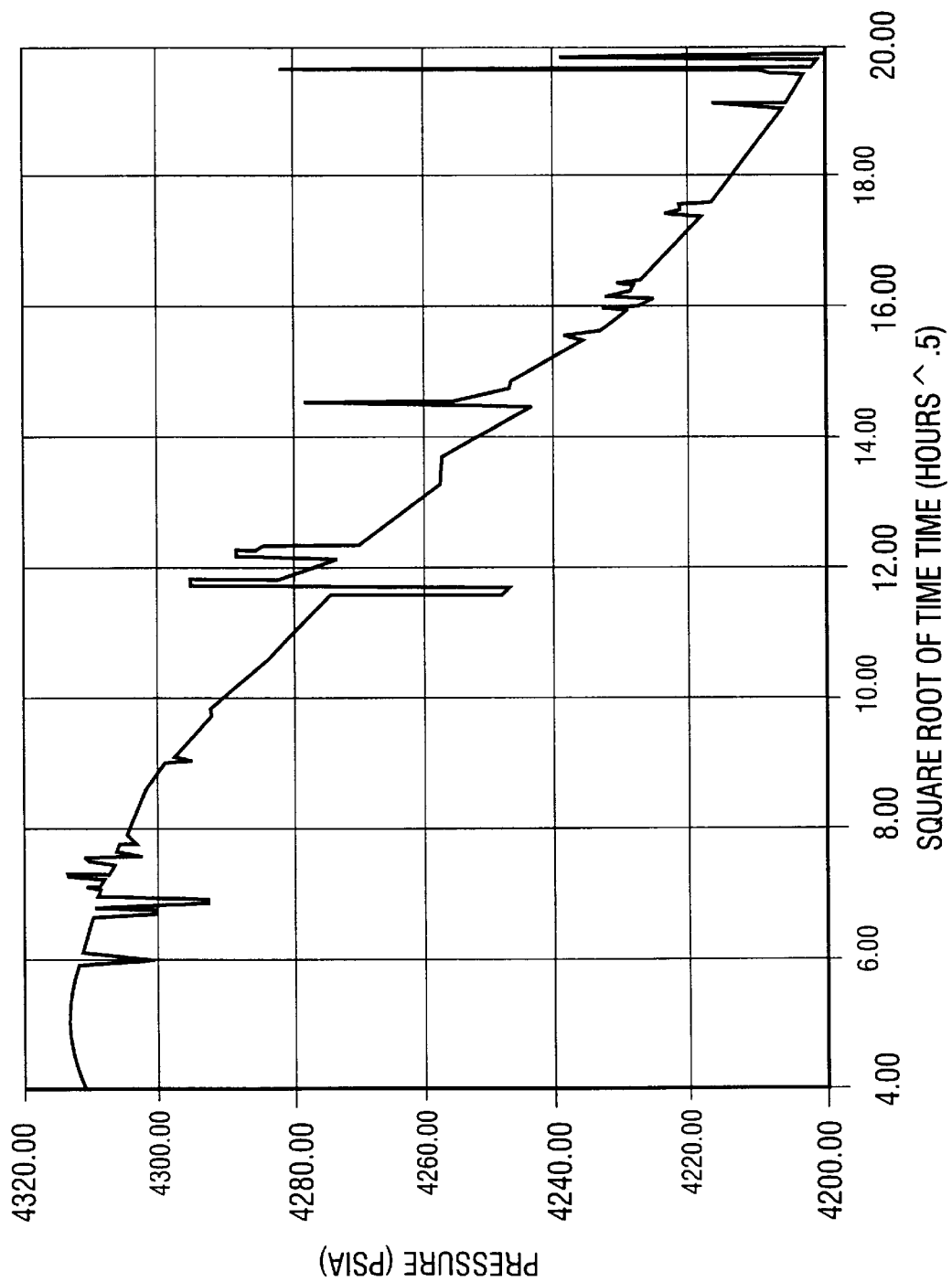
FIG. 15 is a modification of the plot of FIG. 14 wherein the square root of time is one of the variables.

The plot of pressure versus the square root of time, as shown in FIG. 15, indicates the growth of the "active reservoir" as the square root of time. This is the case for a channel-like reservoir or a well flowing between parallel limits. Because the secondary waves grow in a circular fashion while the primary wave may be growing with a slope proportional to $\sqrt{t}$ the "straightness" of the slope lines on each plot provides clues as to the relative disposition of limits. Where all waves (primary plus secondaries) are each growing as a circle or segment thereof, the log plot will have straight segments. Where the primary wave begins to grow between parallel limits, the function will be a collage of products of the $\sqrt{t}$ and log t. The relative straightness of the function to be observed is an engineering judgment.

FIG. 19(a) is a Cartesian coordinate graph wherein the abscissa is the time of flow of the capillary energy shock wave and the ordinates are the slope values for M, calculated from multiple fixed points. This is called a funicular stack. Similar graphs may be constructed wherein the abscissa is the square root of time, the logarithm of time or any function of time.

The purpose of the funicular section is to assist in locating sections of a plot that exhibit persistent and constant slopes punctuated by abrupt changes. The taking of numerical derivatives has been punctuated with problems related to numerical noise for short span derivatives and with problems related to artificial smoothing for long span derivatives. The funicular section is a systematic means for testing a data trend for straightness and then noting abrupt changes in slope upon which the method of this invention is based. This can be done with any functional relationship.

The process is equivalent to laying a straight edge next to a data plot starting with the first point and extending the straight edge to every point in succession along the plot. A calculation of the slope is made and plotted on a separate plot. The process is repeated starting with the second and successive points. The result is like a surveyors traverse in that repeated functions will result in approximately the same derivative values as long as the points lie along the same functional straight line. When the slop increases, the value of the derivative will begin to decrease. At each succeeding point along the straight line, the derivatives will remain constant, that is, produce a plotted function that is constant and then begin increasing. As each line is computed, a series of horizontal lines will appear that increase or decrease with point progression. At the point that represents the abrupt change, a new series of horizontal lines will be generated, producing another flat spot. The slope of the function will progress stepwise until each shift I the plot slope is represented by a step increase or decrease in the slope calculation. The plot will appear to stair step at each abrupt shift in the slope of the plot. This plot is the key in locating secondary and higher wave regenerations in the well bore. The process may be reversed and run backwards. The combination of plots may be overlaid to spot consistent derivative values. The advantage of this method is that it can be run numerically to produce three different views of the process of abrupt slope shifts in various forms of data plots.

Figure 19B:
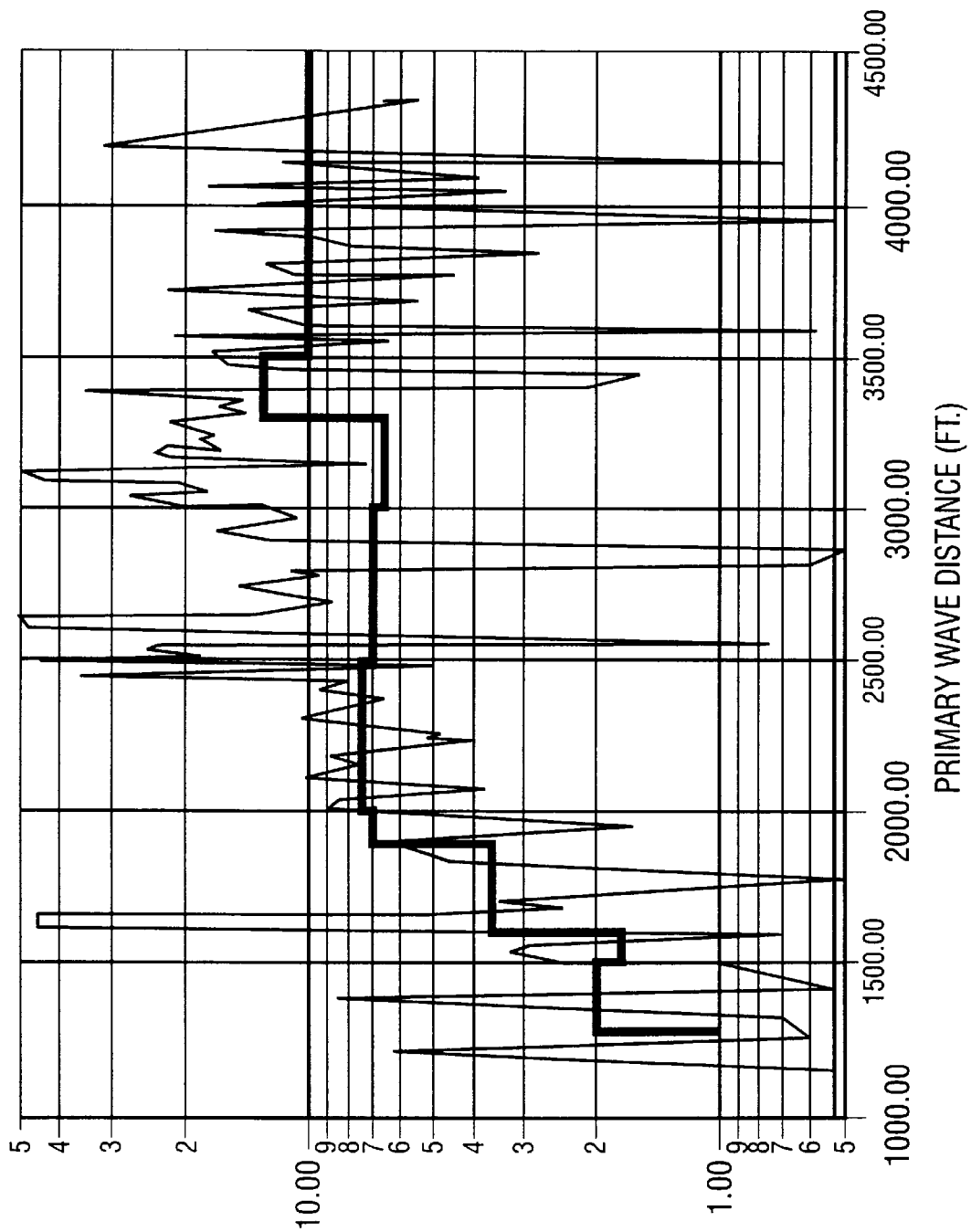
FIG. 19(b) is a plot wherein the abscissa is the logarithm of the flow time of the capillary shock wave and the ordinate in a DIMENSIONLESS ENERGY FUNCTION of values equal to Log $M/M_1$ where M and $M_1$ are slope values of the pressure versus time function.

FIG. 19(b) is a plot wherein the abscissa is the logarithm of the flow time of the capillary energy shock wave and the ordinate is a DIMENSIONLESS ENERGY FUNCTION of values equal to $M/M_1$ where M and $M_1$ are slope values of the pressure versus time function. Similar plots may be constructed with abscissa values equal to the square root of time or any other function of time.

Figure 20:
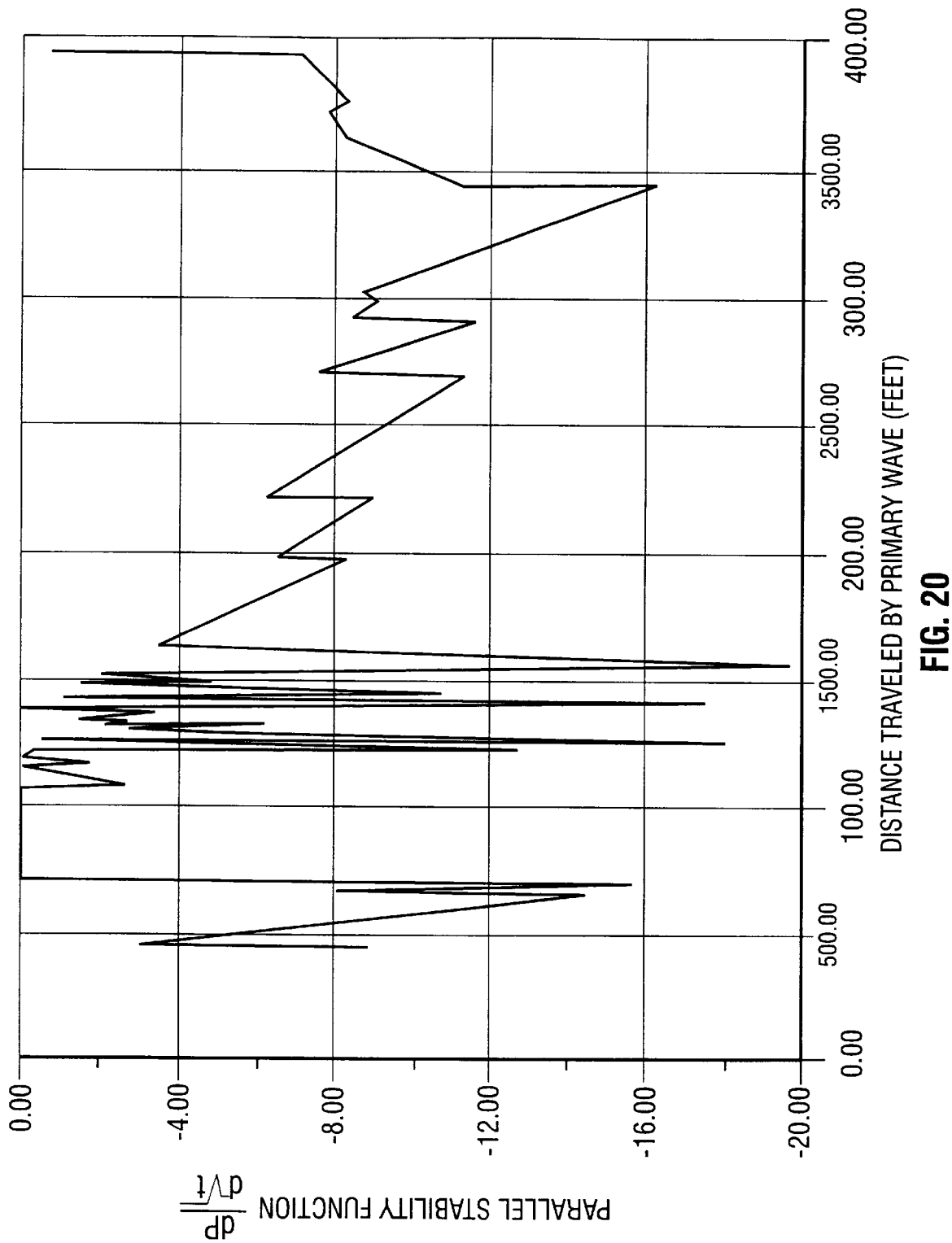
FIG. 20 is a derivative plot wherein the abscissa is the distance in feet traveled by the primary shock wave and the ordinate is a PARALLEL STABILITY FUNCTION with ordinate values equal to $dp/d\sqrt{t}$.

FIG. 20 is a derivative plot wherein the abscissa is the distance in feet traveled by the primary capillary energy shock wave (energy wave) which is proportional to the square root of time and the ordinate is a PARALLEL STABILITY FUNCTION and ordinate values are equal to $(dP/d\sqrt{t})$.

Figure 21:
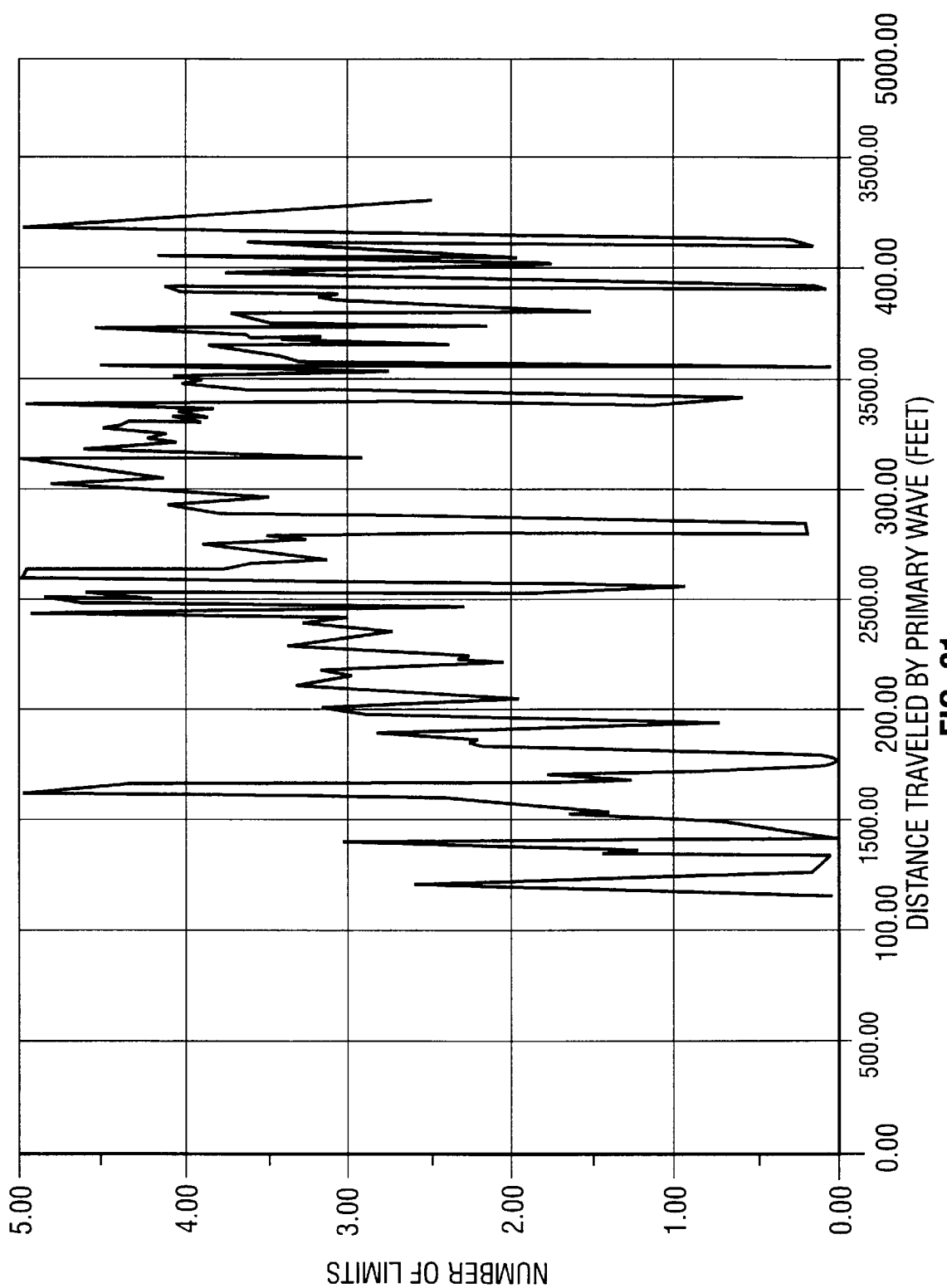
FIG. 21 is a plot of distance traveled by the primary capillary energy shock wave versus the Log $[M(t)/M_1]$/Log (2).

FIG. 21 is a BARLOG® where the abscissa is distance traveled by the primary capillary energy shock wave and the ordinate is the log $(M/M_1)/Log\ 2$.

Whenever the discontinuous plots hover about a constant value as indicated by the bracket on the graph in FIG. 20, it is evidence the wave is encountering parallel boundary limits in the reservoir. It is therefore an invaluable tool for eliminating alternative apparent limit existences when producing an equivalent map from well pressure data.

As noted earlier, the slope M can be expressed as equal to 2.303 t·dP/dt and dP/dt=q/CV. Therefore, $$\frac{dP}{d\sqrt{t}} = \frac{dP}{dt} \cdot \frac{dt}{d\sqrt{t}} = \frac{\left(\frac{dP}{dt}\right)}{\frac{d\sqrt{t}}{dt}} \quad (75)$$

where $$\frac{d\sqrt{t}}{dt} = \frac{1}{2\sqrt{t}} \quad (76)$$

Therefore $$\frac{dP}{d\sqrt{t}} = 2\sqrt{t} \cdot \frac{dP}{dt} = N \quad (77)$$

The function N is the square root of time plot derivative and when N is a constant value, the presentation of parallel boundary limits to the expanding waves is in evidence.

FIG. 21 is a BARLOG® plot of distance traveled by the primary wave versus the

Log [M(t)/$M_1$/Log (2) ], which plot gives a close approximation for the number of times the semilog slope of the pressure vs. time curve has doubled. While a plot of the pressure versus the square root of time or a plot of pressure versus the log of time can be tested with a straight edge to provide the same information as to boundary limits, the graph of FIG. 21 is a simpler format which is sometimes preferable.

Figure 7:
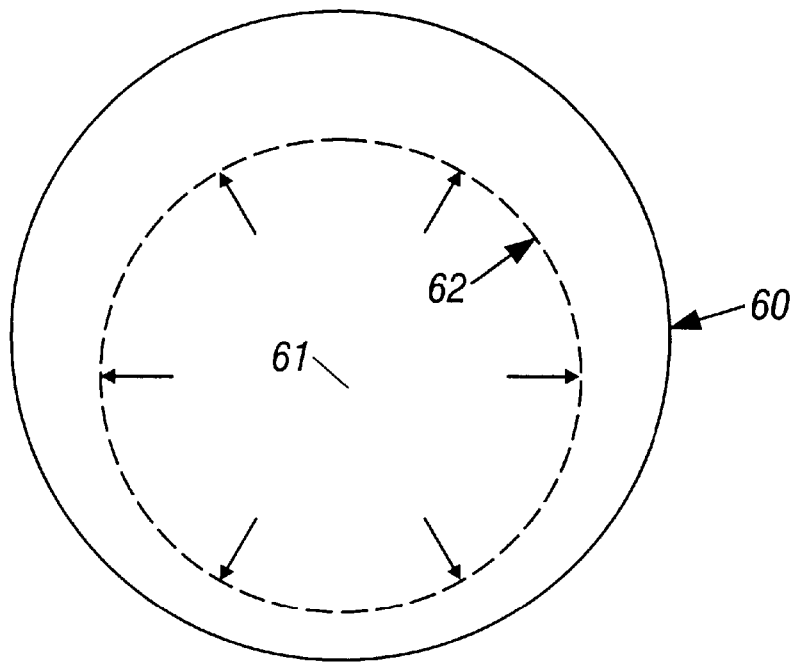
FIG. 7 is a schematic diagram of a reservoir boundary of circular form having a common center with a well bore extending into the reservoir and showing a capillary shock wave expanding concentrically with respect to the well bore.

An example of a reservoir boundary limit 60 of circular form having a common center with the well bore 61 is shown in FIG. 7. In such a reservoir, the primary shock wave 62 strikes the circular limit at all points at the same time. The primary region is in near semi-steady energy state to the time of wave impact, that is, dP/dt is constant throughout the reservoir volume at any given time and upon impact the primary region goes directly from infinite radial flow to a semi-steady energy state. No secondary region is formed.

Figure 8:
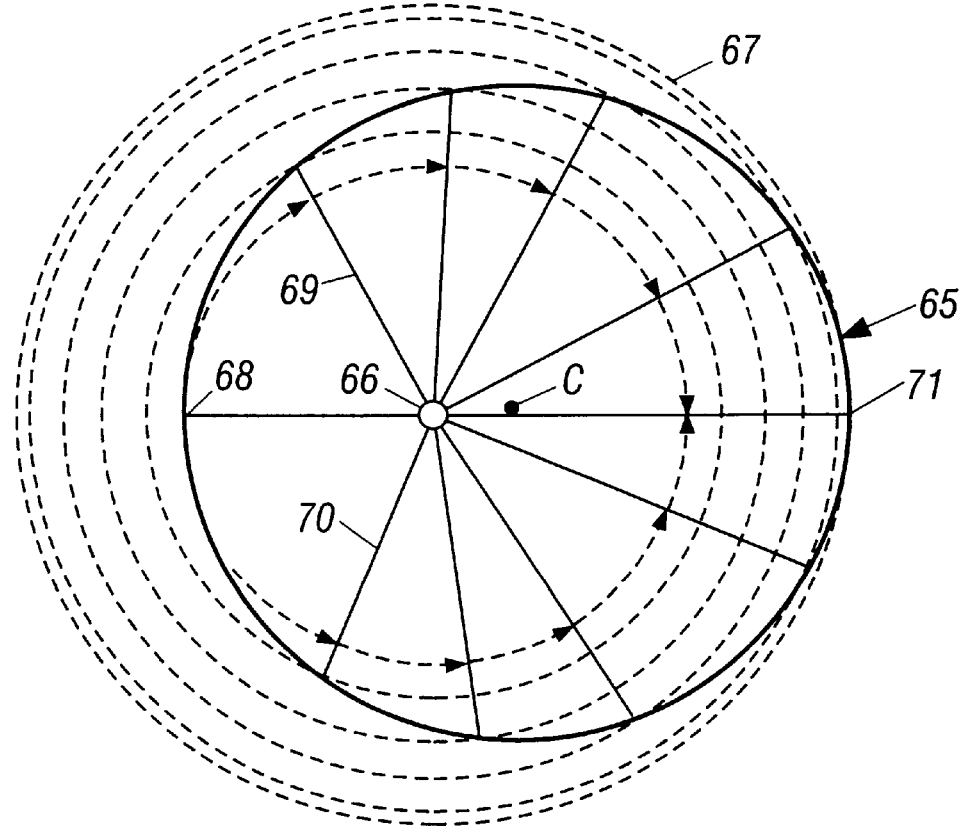
FIG. 8 is a schematic diagram similar to FIG. 7 but showing a circular reservoir wherein the well bore is offset from the center of the reservoir.

Another example is that of a reservoir having a circular boundary 65 whose center C is not coincident with the well bore 66 as is shown in FIG. 8. In this situation, the primary wave 67 strikes the nearest point on the bounding circle and thereafter enlarges its contact with the boundary. The section of boundary which has been impacted by the primary wave is defined by a pair of truncating radial 69, 70, which will travel about the boundary in opposite clockwise and counter-clockwise directions until they join at the farthest point 71 on the boundary. The boundary limit 65 as viewed from the well, appears to be a limit of continuously increasing concavity. A secondary energy region will form concentric about the well bore 66 and rapidly grow in circular expansion to achieve a semi-steady energy state at a rate which depends on its degree of eccentricity with respect to the boundary.

Figure 9:
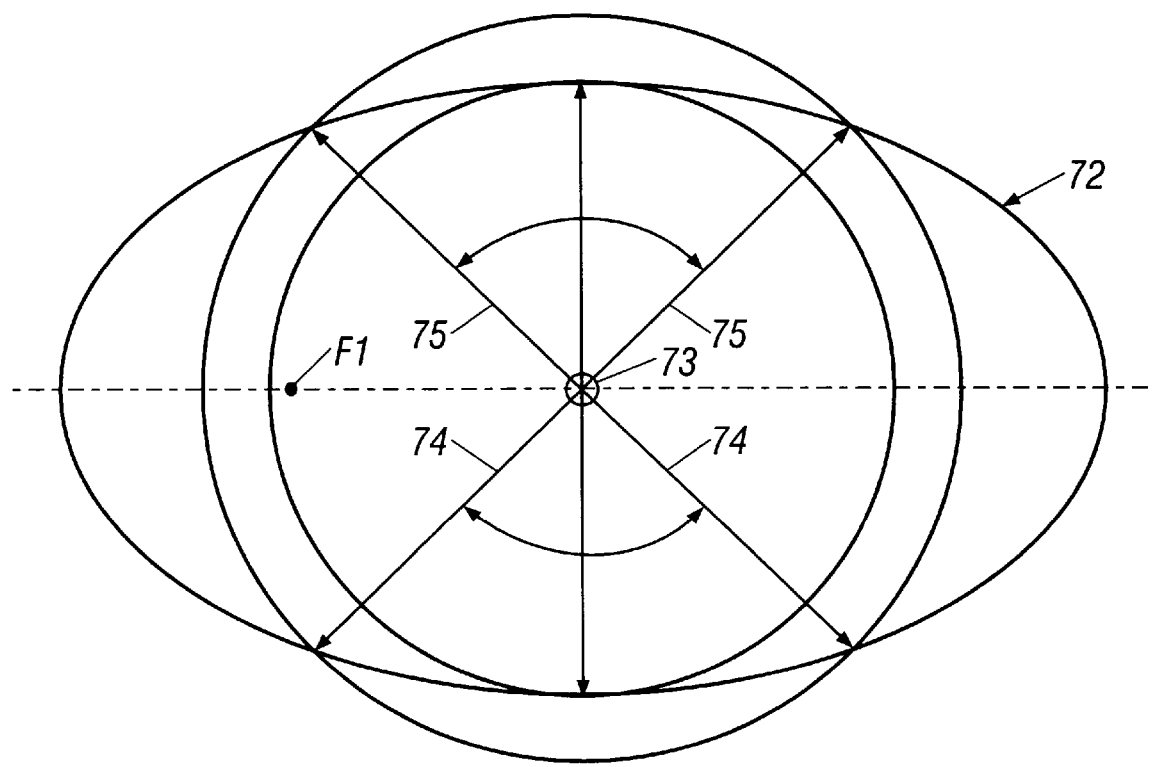
FIG. 9 is a schematic diagram similar to FIG. 7 but showing a reservoir with an elliptically shaped boundary.

If a reservoir boundary and the well therein are related such that the primary shock wave impacts discrete sections of the boundary in spaced time intervals, the secondary energy regions that are formed are ordered in the precedence and sequence at which the primary wave strikes the successive discrete sections of the boundary limits. An example of a reservoir with an elliptical boundary 72 is shown in FIG. 9. If the well 73 is located at the geometric center of the ellipse as in FIG. 9 or on a minor axis of the elliptical boundary and just off the major axis, the well would see two limits before closure, that is, the effect would be the same as though the primary shock wave is striking two isolated and widely separated direct boundary limits, each demarcated by a spreading pair of truncating radial such as the pairs 74, 75. If the well is located along the major axis at one of the foci F1, the well would see only one limit. It is therefore to be noted, that whether a boundary limit section is seen as a reflector by the primary shock wave, has everything to do with the location of the well relative to the reservoir boundary.

For determining the accumulation effect produced by the expanding shock wave when striking a multiplicity of discrete boundary limits, one must consider the energy contributions to the region around the well for each capillary segment around the well bore. Each limit represents an energy reflection contribution of the power being dissipated in the well at any given time and each reflection provides an increment of pressure depletion around the well bore. Each succeeding reservoir limit results in the generation of a secondary wave and a secondary field that responds to the intensity of the field around it. This produces a series of fields of relative intensity. The first secondary field has an intensity of approximately twice $M_1$. By the same arguments stated above the effect of the incorporation of the secondary boundary will be the formation of a field with a relative expansion rate based upon $t_2$ and a relative intensity of approximately 4 $M_1$. The third field is reflected in the same manner with an intensity of approximately 8 $M_1$. The fourth field will develop an intensity again by reflection of approximately 16 $M_1$. Reflection contributions are not to be confused with the superposition of congruent linear fields and their boundary conditions that is the basis for many current solution techniques. The limits as isolated reflectors are coequal in their ability to contribute to the energy reflected to the well bore. This is why impermeable limits or change of phase limits seem to "appear" as abrupt changes in the M slope. A limit can have no impact upon the flow field until it is incorporated into the field by the primary capillary shock wave. Limits appear as discrete events. Current popular diffusion theory is based upon fixed-boundary potential flow models and all of the limits are incorporated into the flow field from the first instant of time and are "seen" as a collage of effects. In potential diffusion fixed boundary models, all calculated responses are smooth.

The summative properties of limits can be seen by adding their contributions as follows:

| | INDIVIDUAL CONTRIBUTION | |
|---|---|---|
| No Limit | $\Delta P_0 = M_1 \log t = \log [t^{M1}]$ | (78) |
| Limit 1 | $\Delta P_1 = M_1 R_1 \log t = \log [t^{M2}]$ | (79) |
| Limit 2 | $\Delta P_2 = M_1 R_1 R_2 \log t = \log [t^{M3}]$ | (80) |
| Limit 3 | $\Delta P_3 = M_1 R_1 R_2 R_3 \log t = \log [t^{M4}]$ | (81) |
| Limit 4 | $\Delta P_4 = M_1 R_1 R_2 R_3 R_4 \log t = \log [t^{M5}]$ | (82) |
| Limit nth | $\Delta P_n = M_1 R_1 R_2 \ldots R_n \log t = \log [t^{Mn+1}]$ | (83) |

The Rs above are the reflectances of the limits. The reflection of each limit is a dimensionless coefficient found by taking the ratio of the current M slope and dividing it by the prior slope. Equation (84) describes the reflectance for term I as $R_i$.

$$R_i = M_{I-1}/M_i \qquad (84)$$

A practical consideration in the course of testing wells is the effect of unplanned shut-ins upon the quality of analysis in long term tests. It has been noted that initiation of production from a well initiates capillary shock waves and a diffusion process between them that ultimately affects every connected pore space in the reservoir. Consequently, interruptions in the well production and flow rate changes introduce complexities to the physical conditions of the reservoir and determination of the reservoir boundary by application of the "Petroporokinekinetics" Theory.

It has been observed that the energy balances are sufficiently large that drift in pressure due to small drifts in the well flow rate are not damaging to the conclusions as to the reservoir geology. However, it remains a most important objective to test the reservoir at the most uniform flow rate that is possible. Accordingly, in addition to the sensing and recording of pressure data, and for quality assurance purposes, the volumetric flow rate from the well should also be recorded as a continuous running flow rate curve. This is a quality assurance check and enables exclusion of data known to be affected by a shut-in or major rate change.

Since the reservoir limit test is to be conducted at a constant flow rate, an inadvertent shut-down on any flowing of the well prior to testing should be followed by a re-equilibration shut-in. The test engineer must use his judgment as to how long a well must build up before he can restart the test. This would normally be done by observing pressure recovery. The author of this concept has developed a series of noise functions that can assist the engineer in determining the necessary length of shut-in based upon energy contributions predicted by "Bubble Theory".

Figure 10:
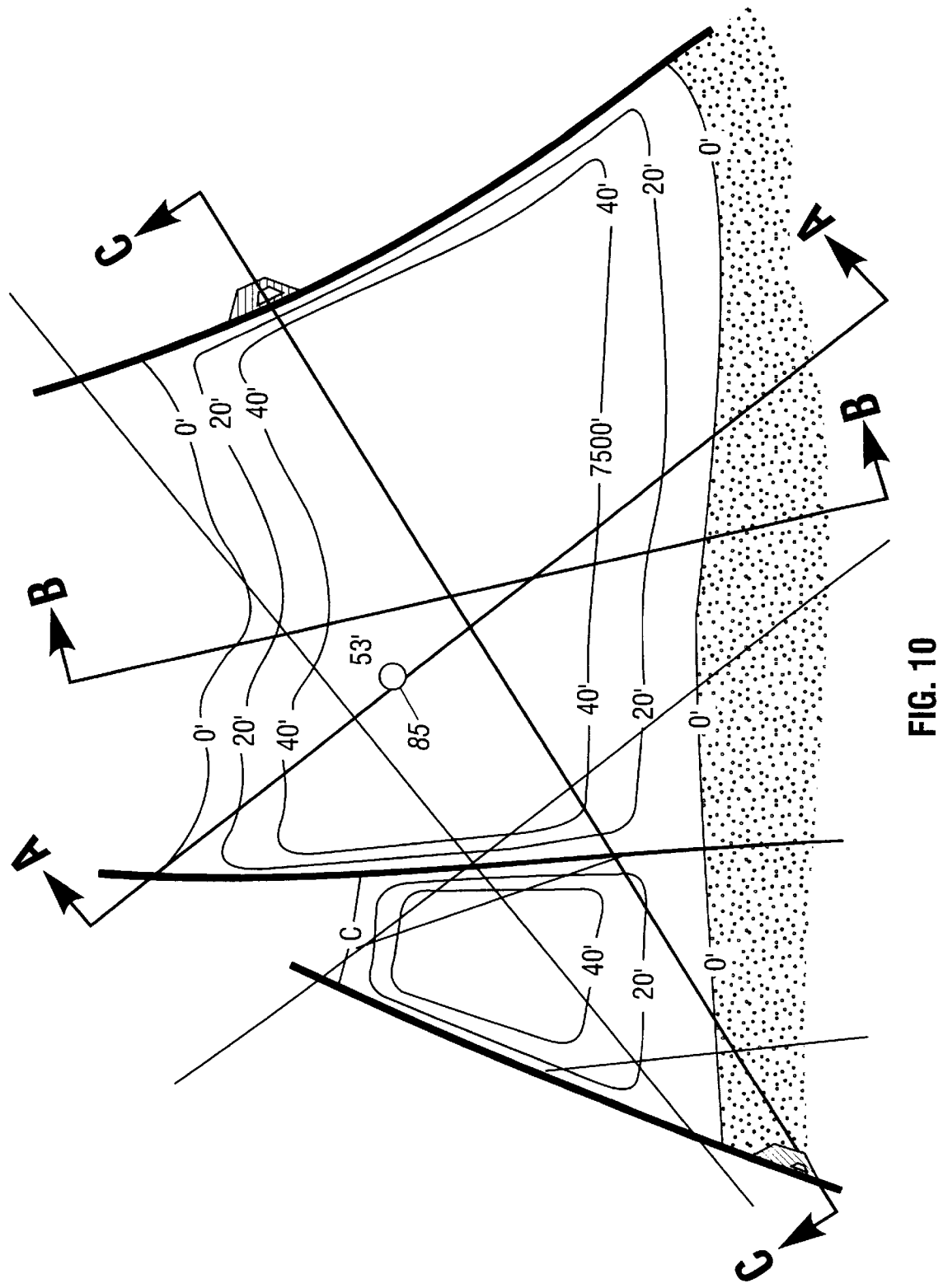
FIG. 10 is a geologist's map of a geologic reservoir prepared from available geology and seismic data.
Figure 11:
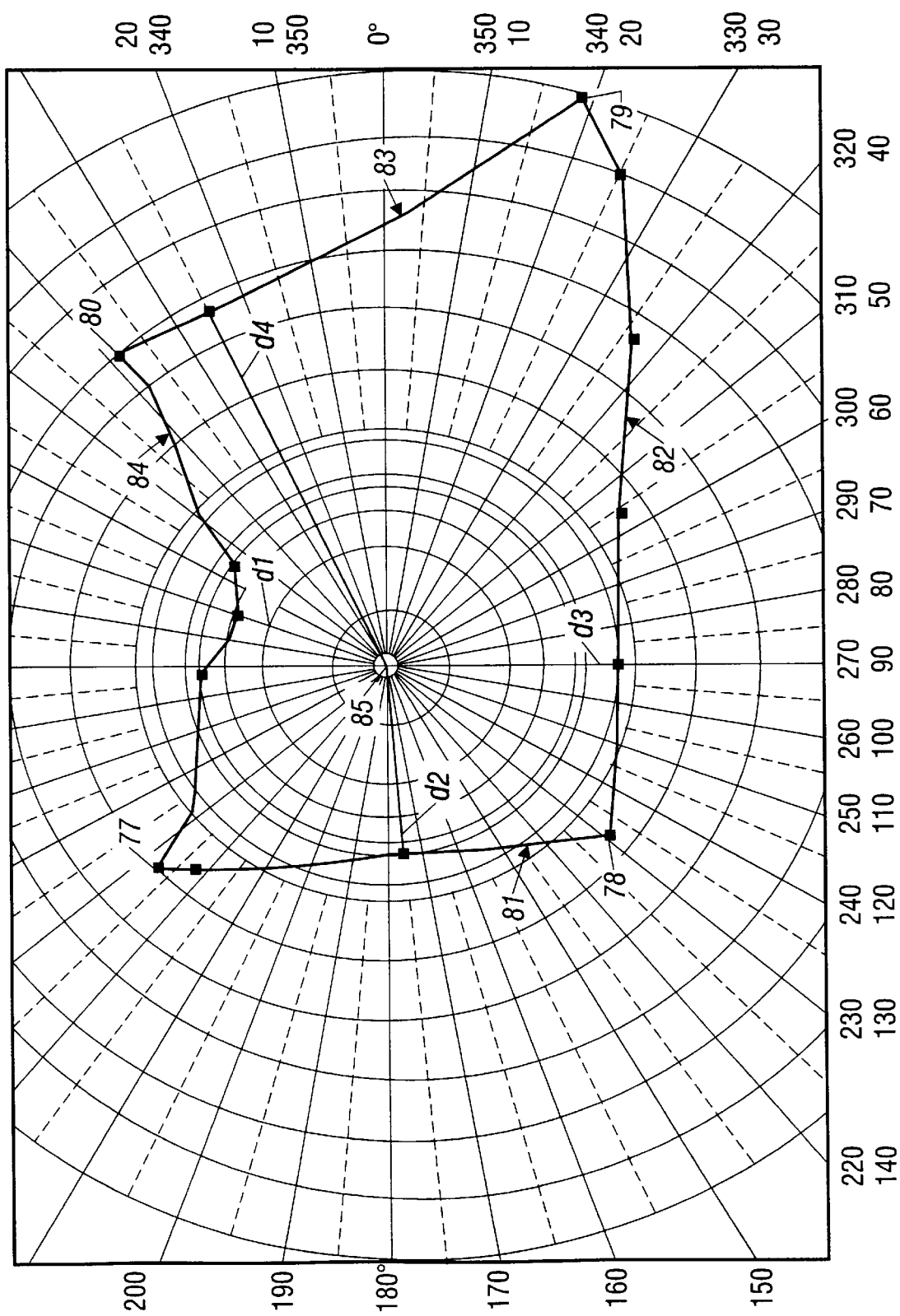
FIG. 11 is a polar schematic diagram of the geologic reservoir shown in the map of FIG. 10, and illustrating discrete sections of the boundary which act as multiple independent reflectors to an expanding capillary wave from the perturbation created by initiation of flow from a well in the reservoir.

In FIG. 10 there is shown the map of a geologic reservoir which was prepared from available geology information such as might be obtained from well cores, seismic cross sections, and the like. A planar map in polar coordinates showing the reservoir boundary or perimeter is illustrated in FIG. 11. The boundary has the general form of a parallelogram with four corners (77, 78, 79, 80) and boundary sections or limits 81, 82, 83, and 84 extending between the respective corners. As seen from the map, an expanding capillary wave generated by the perturbation caused by the initiation of flow from the well 85 which extends into the reservoir, will first impact the nearest boundary limit 84, then the limits 81, 82 and 83 which are at successively greater distances.

Figure 12:
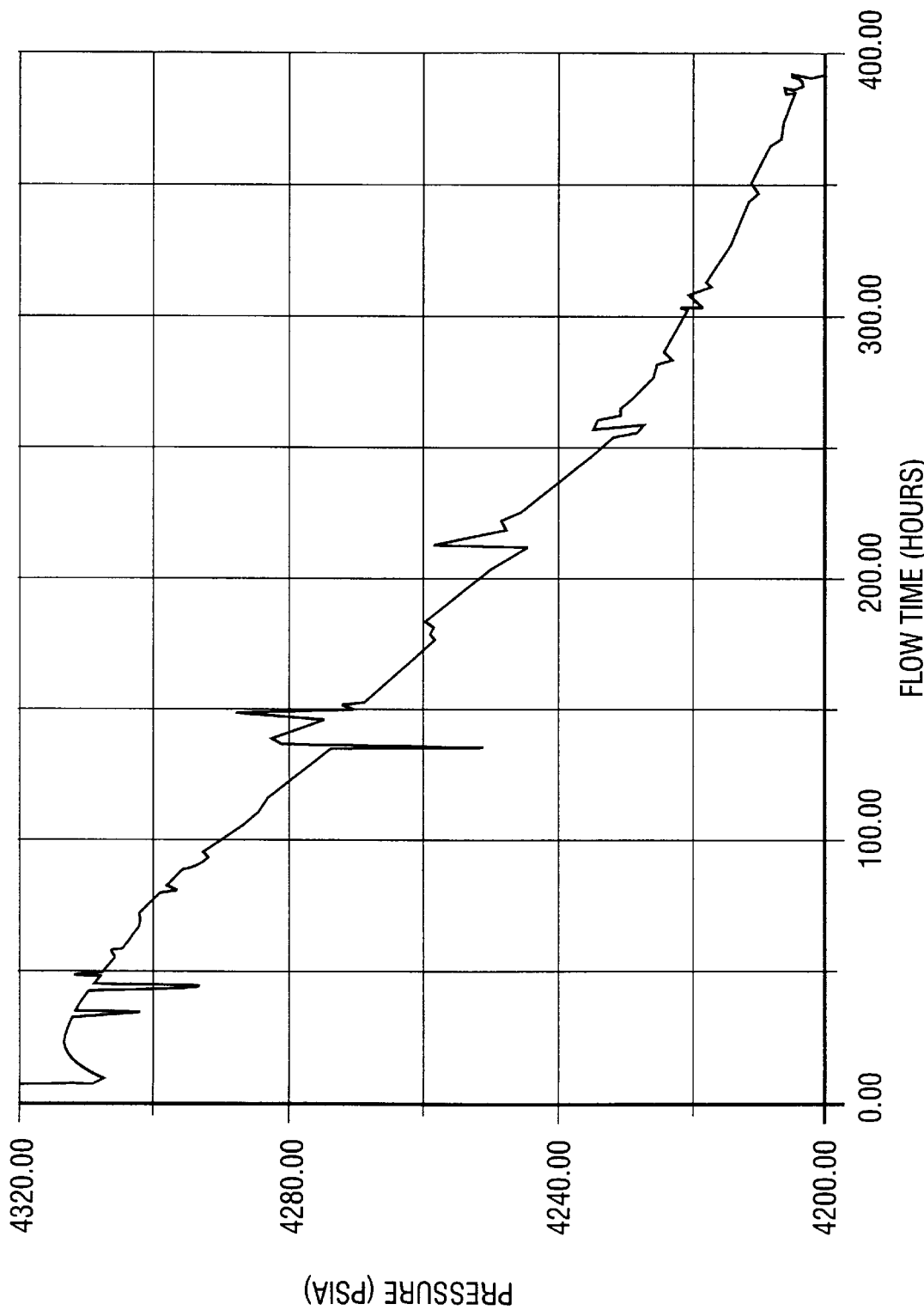
FIG. 12 is a linear data plot of reservoir pressure versus well flow time for a representative geologic reservoir wherein a reservoir well is opened to flow at a constant rate.
Figure 13:
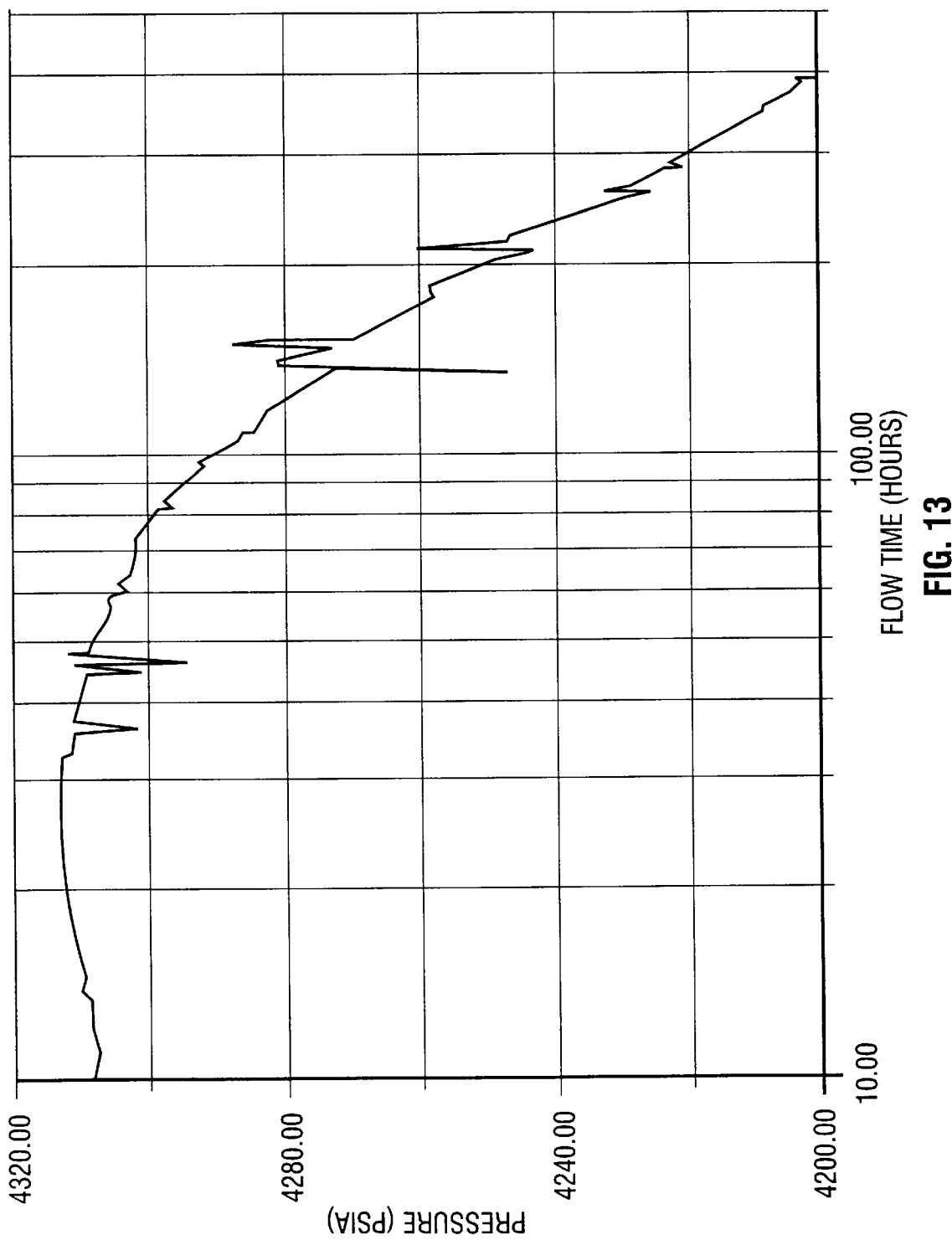
FIG. 13 is a semi-log plot of the same data used for FIG. 12 but showing reservoir pressure as a linear function versus the logarithm of well flow time.

With the well 85 controlled to flow at a substantially constant flow rate by provision of an appropriate well choke, the well pressure is continuously sensed and the pressure data recorded and plotted over a period of time which includes the time of initiation of well flow. FIG. 12 is such a plot of well pressure versus well flow time for the reservoir of FIGS. 10 and 11 wherein well pressure and well flow time are plotted in linear functions. FIG. 13 is a plot of the same well pressure data used in FIG. 12 but wherein well pressure is plotted as a linear function versus the logarithm of time.

It will be apparent from FIG. 13 that an abrupt change of slope in the pressure vs. time curve occurs at times when the expanding shock wave strikes the respective boundary limits 81–84 of the reservoir. FIG. 14 shows the curve of FIG. 13 wherein slope lines of $M_1$–$M_4$ have been added and emphasize the changes in slope.

It is to be appreciated that when the shock wave strikes a reservoir limit the pressure v. time curve displays sudden erratic variations in pressure as a result of the "well bore storage effect" which occurs at the well bore. Immediately thereafter the curve exhibits a change in slope from the $M_1$ portion of the curve, which change persists to indicate the arrival of the wave front at a section of the reservoir, the distance to which may be calculated from data on the pressure-time curve and its curvature derived in accordance with the method of the invention.

It is also to be appreciated that the generation of secondary waves which occur at the time of impact of a shock wave with a reservoir limit, will also produce later and relatively weaker impacts with the reservoir limits which events are indicated by changes in slope of the pressure-time curve occurring in such consistently uniform time intervals that they may be readily discounted.

From the charted data associated with each of the abrupt changes of slope in the pressure vs. time curve, it is possible to derive images of the discrete reflectors of reservoir boundary and to adjust their relative positions to create a simulation of the reservoir boundary which may also be used for verification or amendment of other maps of the boundary which have been prepared from the available geology and geophysical data. In the alternative, from such a geologist's map, it is possible to obtain values for the distances to discrete sections as located on the maps and derive reflectivity values for such discrete sections, which may then be correlated with a pressure vs. time semilog curve obtained when a well within the boundary is opened to flow at a constant rate.

Figure 17A:
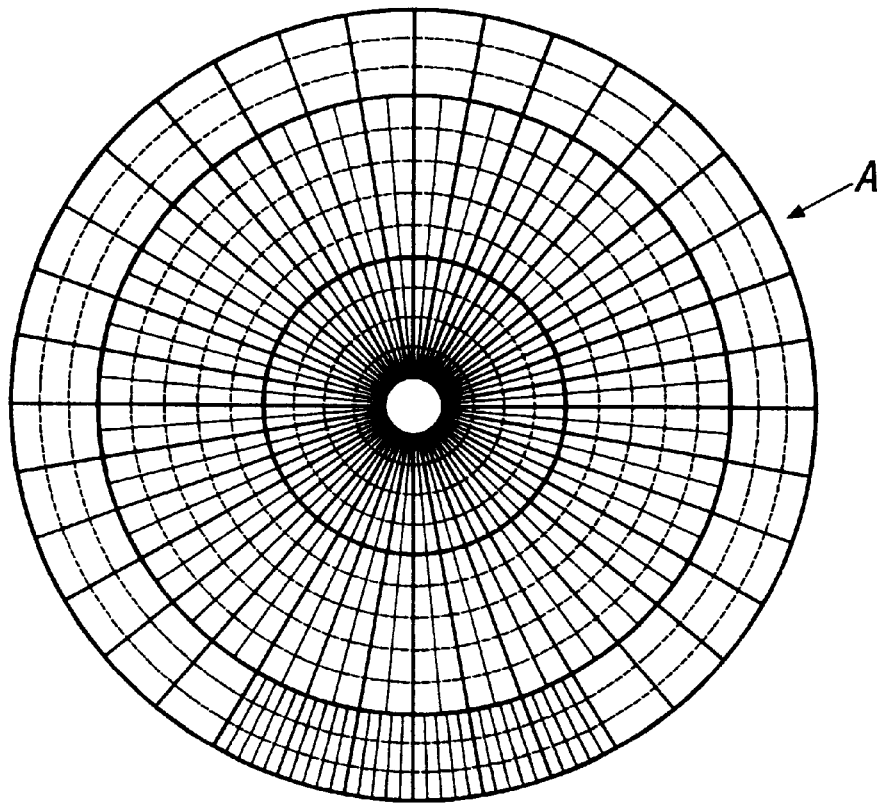
FIGS. 17(a)–17(e) depict the segments of apparent flow angle of reservoir fluid into the well and corresponding to the distance of travel of the primary shock wave prior to and after impact with discrete sections of the reservoir boundary.
Figure 17B:
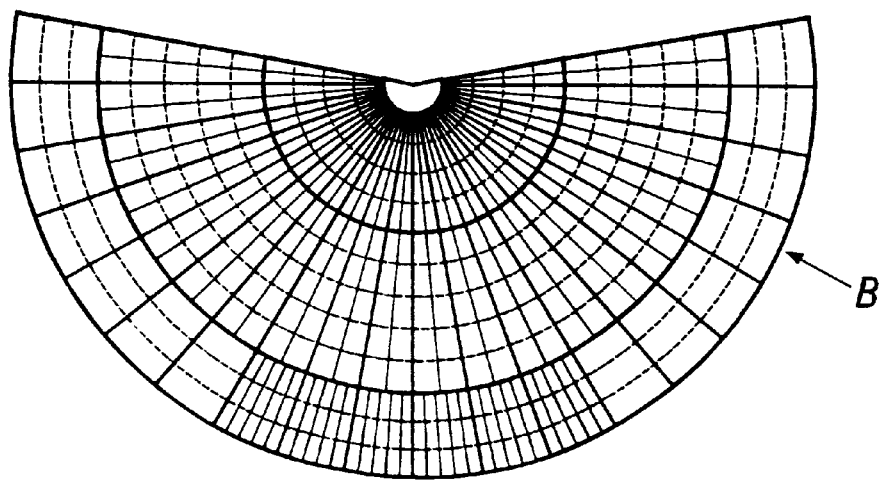
Figure 17C:
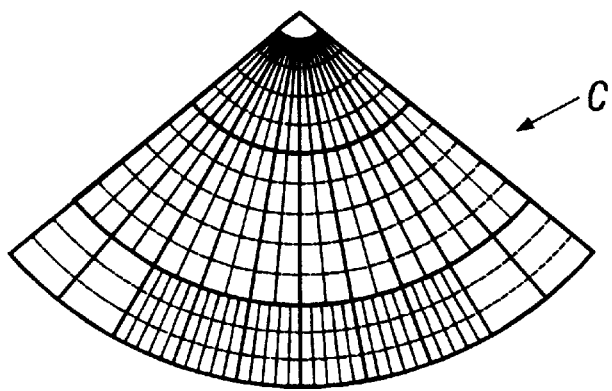

FIGS. 17(a)–17(c) depict the segments of apparent flow angle of reservoir fluid into the well to the reservoir. The flow angles are ordered in correspondence with the increasing distance of travel of the primary shock wave to the discrete sections of the reservoir boundary. FIG. 17(a) shows a 360° flow angle $\Theta_1$ into the reservoir well immediately prior to the impact of the shock wave with the first section of boundary limit. FIG. 17(b) shows the apparent flow angle reduced to approximately 270° after the shock wave impacts the first discrete section of boundary limit. Its value may be obtained from the slope values noted on the pressure vs. time curve and expressed as $$\theta_2 = 2\pi \frac{M_1}{M_2} = 2\pi \frac{1}{R_1} \qquad (85)$$

where $R_1$ is the reflectance value of the first detected boundary limit and values for $M_1$ and $M_2$ obtained from the pressure vs. time curve.

Figure 17D:
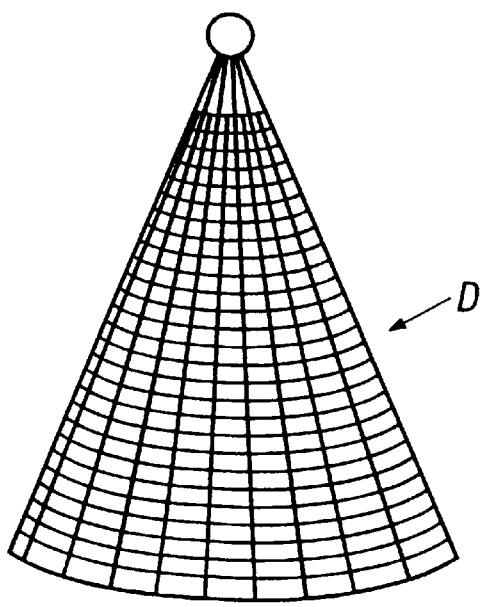
Figure 17E:
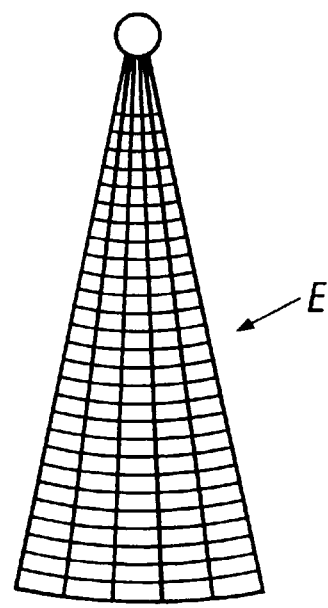

In similar fashion, the flow angle in FIG. 17(e) may be expressed as:

$$\theta_3 = 2\pi \cdot \frac{M_1}{M_3} \qquad (86)$$

or $$\theta_3 = 2\pi \cdot \frac{1}{R_1 R_2} \qquad (87)$$

The flow angle in FIG. 17(d) may be expressed as $$\theta_4 = 2\pi \frac{M_1}{M_4} \quad (88)$$

or $$\theta_4 = \frac{1}{R_1 R_2 R_3} \quad (89)$$

and the apparent flow angle in FIG. 17(e) expressed as $$\theta_5 = 2\pi \frac{M_1}{M_5} \quad (90)$$

or $$\theta_5 = 2\pi \frac{1}{R_1 R_2 R_3 R_4} \quad (91)$$

Figure 18:
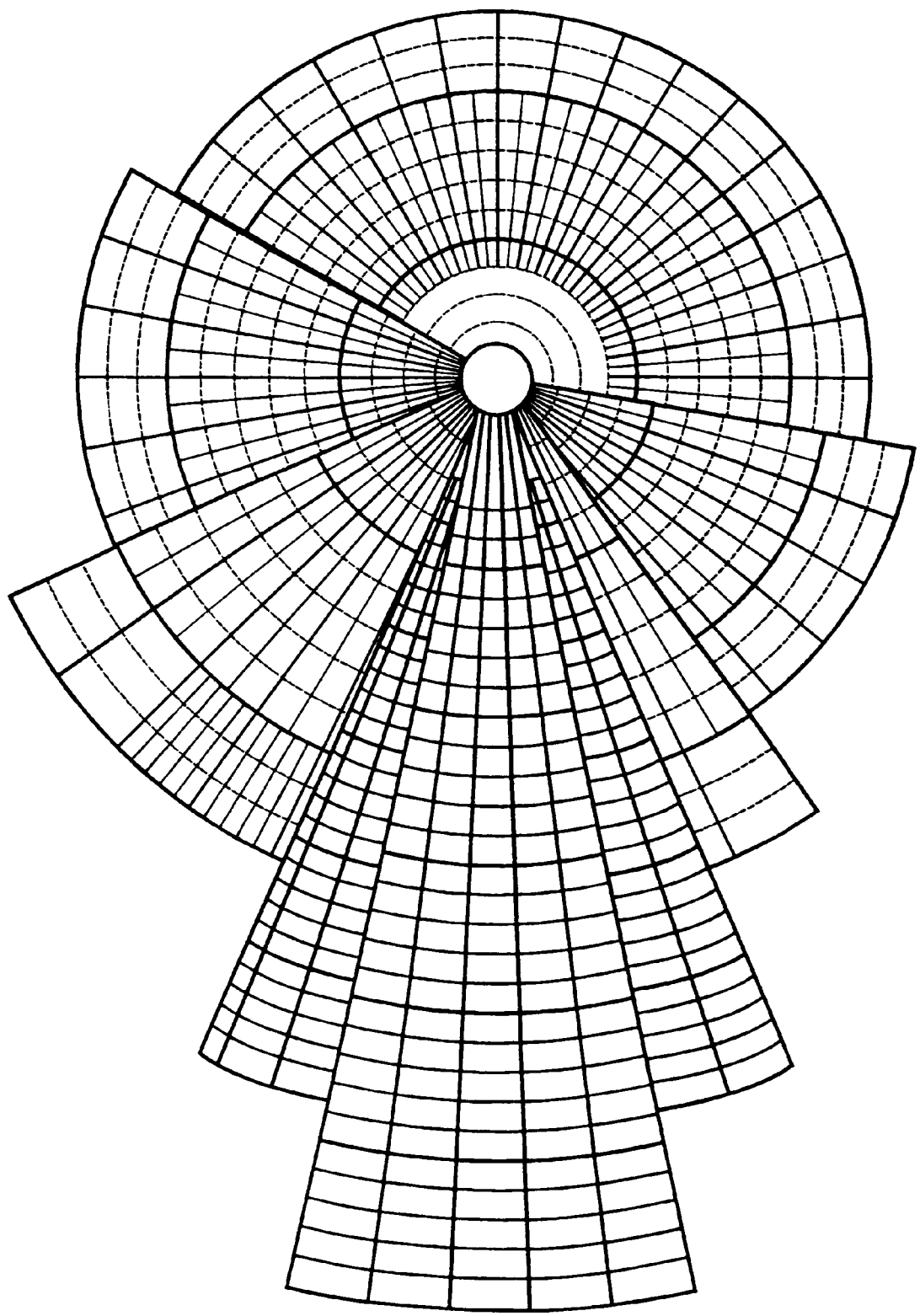
FIG. 18 shows the segments of apparent flow angle in FIG. 17 in superposed relation to one another and in the ordered sequence of the impacts of the expanding shock wave and the increasing distances of the boundary sections from the reservoir well.

In FIG. 18, the flow angles of FIGS. 17(a)–17(e) are shown in superposed relation and with coincident vertices. The flow angles are superposed on one another in the ordered sequence of the impacts of the expanding shock wave with discrete sections of reservoir boundary and the increasing distances of the boundary sections from the reservoir well. This arrangement serves as an aid to the analyst who is "fitting" the boundary sections detected by abrupt changes in slope in the pressure vs. time curve to a reservoir boundary or the reservoir shown on a geologist's map. The flow angle of FIG. 17(b) corresponds to the first limit encountered by the expanding shock wave with flow angles of FIGS. 17(c), 17(d) and 17(e) corresponding to the second, third and fourth limits encountered at successively greater travel times and correspondingly greater distances from the reservoir well.

While the distance to a limit represented by the radius of the arc defined by its associated flow angle is an important factor in associating a limit detected from the pressure-time curve with a corresponding limit on a geologist's map, the relationship of flow angles, one to another, is an important control for establishing the relative orientation of one limit to the others in fabricating a map of the reservoir directly from the pressure-time curve information or in fitting the detected limits to a geologist's map.

While the flow angle B of FIG. 17(b) may be oriented in any direction with respect to the flow angle of FIG. 17(a) although its distance radial may control its orientation with respect to a geologist's map, the orientation of the limit represented by the flow angle C of FIG. 17(c) is limited such that in rotating the angle about its vertex to obtain a "fit", its angle must be included in the flow angle B on which it is superposed, that is, the radii which define its angle must not be rotated beyond the defining radius of the flow angle A towards which it is rotated.

The same limitation is imposed in orienting flow angle C in that it should not be rotating beyond a defining radius of the flow angle B on which it is superposed. Similar restraints are imposed with respect to orientation of flow angle D with respect to flow angle C, and flow angle E with respect to flow angle D.

Accordingly, the method for creating images of discrete sections of a reservoir boundary and relatively locating such images to create a map of the reservoir from data obtained from a pressure vs. time semilog curve obtained from pressure data in a well at constant flow from the reservoir, involves the steps of determining the minimum radial distance from the well bore to each discrete reservoir boundary limit indicated by each abrupt change of slope in the pressure v. time curve, said minimum radial distance being derived according to the formula $$d = 2\sqrt{\eta\, t}$$

where d is the distance to the nearest point on the discrete boundary limit, η is the hydraulic diffusivity of the reservoir formation expressed as area units per unit of time and t represents time elapsed since the initiation of well flow to the arrival of the shock wave at the discrete boundary limit. The next step is creating a polar coordinate system chart where the well bore represents the origin of the polar coordinate system and each detected discrete boundary limit is located on the chart at a distance from the origin corresponding to the distance derived therefor. The method further requires for each discrete limit, inscribing on the chart a circle which is centered about the origin and inscribing a minimal radius corresponding to the distance d derived for each such limit. The minimal radius may be inscribed on said chart in an arbitrary direction of the origin, each intersection of a minimal radius line and its associated circle representing a point of tangency of a tangent line to the circle at the initial point of contact of the shock wave with the reservoir limit. For each discrete reservoir limit indicated by an abrupt change of slope in the function of fluid pressure versus time, the method further requires calculating the slope $M_i$ of the pressure-time function immediately following said abrupt change and also the slope $M_{i-1}$ of the pressure-time function immediately preceding the abrupt change and then, for each discrete reservoir limit, calculating the value $$\frac{2\pi M_{i-1}}{M_i} = \alpha + \beta + \pi$$

where α+β represents the sum of the angles of tangential deflection of the discrete reservoir limit between the spreading points of contact of the expanding wave with said discrete reservoir limit which may be represented as connected to the well by truncating radii, said truncating radii being of equal length to one another and located on opposite sides of the associated minimal radius and at equiangular spacing with respect thereto. Also, for each discrete reservoir limit, the angle ΔΘ between the two truncating radii associated with said each discrete reserve limit is calculated in accordance with the formula $$\Delta\theta = 2\theta - (\alpha + \beta)$$

and $$\theta = \mathrm{Tan}-1\sqrt{\frac{t - t_1}{t_1}}$$

where $t_i$ is the travel time of the capillary shock to said discrete reservoir limit and t is a selected travel time of the shock wave where t is greater than $t_i$, each said discrete reservoir limit having a length defined by the distance between the intersections of the pair of truncating radii with the tangent line associated with said discrete reservoir limit.

For each said discrete reservoir limit, a dimensionless reflectivity value $R_i$ may then calculated in accordance with the formula $$R_i = \frac{2\pi}{\pi + \alpha + \beta}$$

wherein values of $R_i>2$ indicates concavity of a limit and $R_i<2$ indicates convexity. The angular disposition of each said discrete reservoir limit is then adjusted about the origin of the polar coordinate chart and then re-positioned on its tangent point of contact with its associated distance radial in relationship with the other discrete reservoir limits to thereby provide a simulation of the reservoir boundary. The map then generated may be compared to a geologist's map for verification or amendment of the geologist's map.

In the alternative, the values for d and $\alpha+\beta$ for each detected limit may be compared with values for d and $\alpha+\beta$ associated with discrete sections of the reservoir boundary as postulated in a geologist's map of the reservoir.

FIG. 16 is a reproduction of the map of the reservoir shown in FIG. 10 with a polar plot of circular arcs disposed about the well 85 at distances corresponding to values of $d=2\sqrt{\eta t}$ derived from lines of wave impact with discrete sections of the boundary as indicated by abrupt changes of slope in the pressure v. time function. For each arc 91–94 with its own radius corresponding to distances $d_1$-$d_4$ of limits 84, 81, 82, 83 from the well 85, the angle $\Theta_i$ of the arc is the apparent flow angle into the well expressed as $\Theta_i=2\cdot\pi\cdot(M_{i-1}/M_i)\cdot t$. The different arcs are assembled to provide an equivalent map of the reservoir about the well. The geologist's map is almost always an aid to the assembly of the equivalent map which can therefore be used to verify the geologist's map or to urge its modification.

A Table of values used in preparing the composite of assembled flow angles of FIGS. 17(a)–17(e) and superposed on the geologist's map of FIG. 16 is as follows:

TABLE

|  | d | θ | α | β |
|---|---|---|---|---|
| Limit 1 | 1300 | 70° | −2.91602 | 6.083785 |
| Limit 2 | 1600 | 176° | 0 | 0 |
| Limit 3 | 1900 | 270° | 0 | 0 |
| Limit 4 | 3300 | 25° | 0 | 0 |
| WATER | 4000 | 39° | 0 | 1.411928 |

Referring again to FIG. 19B, the solid line is an interpretation based on the values from the table.

It is to be appreciated that the method described herein is directed to the processing of well pressure data for the goal of determining the shape of each independent boundary section of a geologic reservoir and deriving the size of the reservoir therefrom. Although the boundary shapes as determined by the theory may not be mathematically unique, they are nevertheless geometrically constrained over their ranges of possible existence such that a set of symmetrical images are created that can logically be assembled into a representative map of the reservoir. When such images are used in correlation with other maps obtained from geology and geophysical data for either verification or amendment thereof, the method of the invention can have significant economic impact. An application of the method can save a commercial developer from large financial losses if geology and seismic studies indicate a large reservoir when in reality it is of uneconomic size. It can also allow the booking of proved reserves much earlier in the development of a proven large field than would normally be the case.

In the absence of a geologist's map, those who are knowledgeable in the art of imaging would recognize that any image that is constructed from time observations at a single well would have ambiguities associated with it. For example, the constructed map could be rotated arbitrarily about an axis passing through the well and normal to the plane of the map to give a new map that would match the observations as well as the original constructed map. The map could then be viewed as having a rotational ambiguity about an axis through the vertical wellbore. The map also has a "mirror" ambiguity, i.e, a mirror image of a constructed map in a plane normal to the map would also satisfy the data. Other ambiguities may also exist, depending upon the complexity of the reservoir.

Those knowledgeable in the art would also recognize that ambiguities of this kind are readily resolved by observations from multiple locations. A simple example illustrates this. Consider a sonar or radar device that is omnidirectional. The travel time of a reflected signal from a single object merely gives a distance to the object and no information about its bearing (rotational ambiguity). However, by measuring the travel time of a reflected signal at two observation points, the position of the object is narrowed to two possible locations, one on either side of the straight line between the observation points (mirror ambiguity). A third observation point that is not in line with the first two observation points determines the position of the object uniquely.

In the context of the present invention, this means that if pressure tests are carried out in two or more different wells in the reservoir, even without the availability of a geologist's map, the ambiguities in the map can be narrowed or even eliminated. The simplest form of this would consist of a flow test in one well while simultaneously observing the shut in pressure at another well in the reservoir. The second well would remain shut in while the first well is shut in. Then the second well would be flowed to gain a different perspective of the reservoir from a different location. Such multiple well observations and determination of reservoir boundaries from such observations are intended to be within the scope of the present invention.

It is to be appreciated therefore that the foregoing disclosure of a novel method for producing and determining images of a geologic reservoir is for purposes of illustration and explanation, and that changes may be made in the method steps within the scope of the appended claims without departing from the spirit of the invention.

What is claimed is:

1. A method for determining a plurality of positions of a boundary of a subterranean reservoir containing a fluid under a pressure, comprising:

(a) obtaining over a time interval a pressure of the fluid in a well penetrating the reservoir;

(b) determining a slope of the pressure of the fluid as a function of time;

(c) detecting a plurality of times "$t_i$" corresponding to an abrupt change in the slope of the pressure as a function of time; and (d) determining a plurality of ranges "$d_i$" of influence of the well as a function of the abrupt change.

2. The method of claim 1 wherein the slope of the pressure of the fluid as a function of time is determined on a plot selected from the set consisting of: (i) the pressure of the fluid versus the logarithm of time, and (ii) the pressure of the fluid versus the square root of time.

3. The method of claim 2 wherein the pressure of the fluid in the well is obtained under a condition selected from the set consisting of: (i) flow at a substantially constant rate of flow of the fluid, (ii) a zero rate of flow, and (iii) following an injection of borehole fluid into the formation.

4. The method of claim 2 further comprising using a funicular stack to determine the abrupt changes in slope of pressure of the fluid as a function of time.

5. The method of claim 1 wherein the reservoir has a diffusivity η and the the relation between d, t and η is given by $$d = a\sqrt{(\eta t)}, \text{ wherein } a \geq 0.75.$$

6. The method of claim 1 further comprising determining a curvature of the boundary.

7. The method of claim 6 wherein the time interval is sufficiently large for the pressure of the fluid assumes a constant linear relationship with respect to time.

8. The method of claim 1 wherein the pressure is obtained for a set of discrete values of time over the time interval.

9. The method of claim 1 wherein the pressure is obtained for continuous values of time over the time interval.

10. In a subterranean reservoir having a boundary and containing a fluid under a pressure, a method for determining the boundary, comprising:
   (a) obtaining over a time interval the pressure of the fluid in a plurality of wells penetrating the reservoir;
   (b) determining a slope of the pressure of the fluid in each of said plurality of wells as a function of time;
   (c) detecting a plurality of times "$t_i$" corresponding to an abrupt change in the slope of the pressure as a function of time at each of the plurality of wells; and
   (d) determining a plurality of ranges $d_i$ of influence of the plurality of wells as a function of the abrupt changes.

11. The method of claim 10 wherein the pressure of the fluid in each of the plurality of wells is measured under a condition selected from the set consisting of: (i) flow at a substantially constant rate of flow of the fluid, (ii) a zero rate of flow, and (iii) following an injection of borehole fluid into the formation.

12. The method of claim 10 wherein the slope of the pressure of the fluid as a function of time is determined on a plot selected from the set consisting of: the pressure of the fluid versus the logarithm of time, and the pressure of the fluid versus the square root of time.

13. The method of claim 10 further comprising using a funicular stack to determine the abrupt changes in slope of pressure of the fluid as a function of time.

14. The method of claim 10 wherein the reservoir has a diffusivity η and the relation between $d_i$, $t_i$ and $\eta_i$ is given by $d_i = \alpha\sqrt{\eta t_i}$, wherein $\alpha \geq 0.75$.

15. The method of claim 10 further comprising determining a curvature of the boundary from the abrupt change in the slope of the pressure as a function of time.

16. The method of claim 10 wherein the time interval is sufficiently large for the pressure of the fluid assumes a constant linear relationship with respect to time.

17. The method of claim 10 wherein the pressure is obtained for a set of discrete values of time over the time interval.

18. The method of claim 10 wherein the pressure is obtained for continuous values of time over the time interval.

19. A method for determining a position of a boundary of a subterranean reservoir containing a fluid under a pressure, comprising:
   (a) obtaining over a time interval pressure of the fluid in a well penetrating the reservoir;
   (b) determining a slope of the pressure of the fluid as a function of time;
   (c) detecting a time "t" corresponding to an abrupt change in the slope of the pressure as a function of time;
   (d) relating the time t to an initiation of a shock wave in the fluid; and
   (e) determining a range "d" of influence of the well as a function of the passage of the shock wave.

20. The method of claim 19 wherein the slope of the pressure of the fluid as a function of time is determined on a plot selected from the set consisting of: (i) the pressure of the fluid versus the logarithm of time, and (ii) the pressure of the fluid versus the square root of time.

21. The method of claim 19 wherein the pressure of the fluid in the well is obtained under a condition selected from the set consisting of: (i) flow at a substantially constant rate of flow of the fluid, (ii) a zero rate of flow, and (iii) following an injection of borehole fluid into the formation.

22. The method of claim 19 further comprising using a funicular stack to determine the abrupt changes in slope of pressure of the fluid as a function of time.

23. The method of claim 21 further comprising determining a curvature of the boundary.

24. The method of claim 23 wherein the time interval is sufficiently large for the pressure of the fluid assumes a constant linear relationship with respect to time.

25. The method of claim 19 wherein the pressure is obtained for a set of discrete values of time over the time interval.

26. The method of claim 19 wherein the pressure is obtained for a continuous values of time over the time interval.

* * * * *